United States Patent
Provis et al.

(10) Patent No.: US 7,286,076 B1
(45) Date of Patent: *Oct. 23, 2007

(54) GENERATING A MARK/SPACE TABLE AND A STRING OF TIMING INFORMATION ON A REMOTE CONTROL DEVICE

(75) Inventors: Adam P. G. Provis, Cowes (GB); Oscar C. Miramontes, El Paso, TX (US); George C. Vergis, Fremont, CA (US)

(73) Assignee: Zilog, Inc., San Jose, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/928,576

(22) Filed: Aug. 27, 2004

Related U.S. Application Data

(63) Continuation-in-part of application No. 10/777,023, filed on Feb. 10, 2004.

(60) Provisional application No. 60/576,941, filed on Jun. 3, 2004.

(51) Int. Cl.
*H04L 17/02* (2006.01)

(52) U.S. Cl. .................. 341/173; 341/176; 340/825.72

(58) Field of Classification Search ................ 341/173, 341/176; 340/825.22, 825.24, 825.25, 825.69, 340/825.72; 348/734; 398/106–112; 717/115, 717/139
See application file for complete search history.

(56) References Cited

U.S. PATENT DOCUMENTS

| | | | |
|---|---|---|---|
| 4,866,434 A * | 9/1989 | Keenan | ................. 340/825.72 |
| 5,099,233 A | 3/1992 | Keenan | |
| 5,228,077 A | 7/1993 | Darbee | |
| 5,282,028 A * | 1/1994 | Johnson et al. | ............. 725/139 |
| 5,850,304 A * | 12/1998 | Elmers et al. | ............. 398/107 |
| 5,987,256 A * | 11/1999 | Wu et al. | .................... 717/146 |
| 6,104,334 A * | 8/2000 | Allport | ........................ 341/175 |
| 6,260,157 B1 | 7/2001 | Schurecht | |
| 6,308,317 B1 | 10/2001 | Wilkinson | |
| 6,408,435 B1 * | 6/2002 | Sato | ........................... 725/58 |
| 6,424,285 B1 * | 7/2002 | Perdue et al. | ............... 341/176 |

(Continued)

OTHER PUBLICATIONS

Harkey, Appajodu and Larkin, "Wireless Java Programming for Enterprise Applications," Wiley Publishing (2002) ISBN 0-471-21878-2, chapters 5 and 7, 48 pages total.

*Primary Examiner*—Edwin C. Holloway, III
(74) *Attorney, Agent, or Firm*—Imperium Patent Works; Darien K. Wallace; Glen B. Choi

(57) ABSTRACT

A remote control device detects that a command has been chosen. A command may, for example, have been chosen by a user pressing a key on the remote control device. In response, the remote control device generates a mark/space table and a string of timing information. The string of timing information includes entries that refer to mark time values and space time values in the mark/space table. The string of timing information also may contain special control portions (for example, a control portion can indicate that a portion of the string of timing information should be repeated a given number of times). The mark/space table and the string of timing information are then used to generate an operational signal that is transmitted from the remote control device. The mark/space table and string of timing information is a particularly compact way of describing an operational signal for a remote control device.

22 Claims, 10 Drawing Sheets

U.S. PATENT DOCUMENTS

| | | |
|---|---|---|
| 6,539,437 B1 | 3/2003 | Windheim et al. .......... 709/330 |
| 6,959,865 B2 | 11/2005 | Walczyk |
| 2001/0033243 A1* | 10/2001 | Harris et al. ................ 341/176 |
| 2003/0034957 A1* | 2/2003 | Dubil et al. ................ 345/158 |
| 2003/0095211 A1 | 5/2003 | Nakajima ................... 348/734 |
| 2003/0193426 A1 | 10/2003 | Vidal .......................... 341/176 |

* cited by examiner

MARK/SPACE PAIR BYTE

CONTROL BYTE

```
600 RESET:
601    <AUX0>                                        ; CALL AUX ROUTINE 0 WHICH CARRIES OUT A KEY SCAN
602    <CASE16><#03>                                 ; CASE OF 3 OPTIONS AGAINST ADR0
603    <#00> <#00> <#RESET_H><#RESET_L>              ; IF ADR0=0000h GOTO RESET
604    <#00> <#01> <#SEND_CODE_H><#SEND_CODE_L>;     IF ADR0=0001h GOTO SEND_CODE
605    <#00> <#02> <#SET_CDSET_H><#SET_CDSET_L>      ; IF ADR0=0002h GOTO SET_CODESET
606              <#RESET_H><#RESET_L>                ; ELSE RESET

607 SEND_CODE:
608    <CP8(1) <#PROG_KEY>                           ; COMPARE ADR1 WITH PROG_KEY
609    <IFNF(1)>                                     ; IF FLAG,
610         <JP(D)><#RESET_H><#RESET_L>              ;    JUMP TO RESET
611    <CP8(1)> <#LOAD_KEY>                          ; COMPARE ADR1 WITH LOAD_KEY
612    <IFNF(1)>                                     ; IF FLAG,
613         <JP(D)><#LOAD_CODE_H><#LOAD_CODE_L> ;    JUMP TO LOAD CODE
614    <SWP(0,1)>                                    ; SWAP ADR0 WITH ADR1
615    <LOOK8><#KEY_TABLE_H><#KEY_TABLE_L>           ; LOOKUP ADR0 AGAINST KEY_TABLE
616    <SETK(1)>                                     ; SET KEY WITH ADR1_L
617    <RTRV(0)>                                     ; RETRIEVE STORE0 (CODESET) INTO ADR3
618    <CLRU(3)>                                     ; CALL CODESET
619    <SEND>                                        ; START SENDING IR SIGNAL

620 WAIT_KEY:
621    <AUX0>                                        ; CALL AUX ROUTINE 0 KEY SCAN
622    <CP(0)><#00><#00>                             ; COMPARE ADR0 WITH 0
623    <IFF(1)>                                      ; IF NUMBER OF KEYS PRESSED <> 0
624         <JP(D)><#WAIT_KEY_H><#WAIT_KEY_L>        ; CONTINUE TO SCAN
625    <STOP>                                        ; STOP SENDING IR SIGNAL
626    <JP(D)><#RESET_H><#RESET_L>                   ; RETURN TO MAIN LOOP

627 KEY_TABLE:
628    <#32> <#00>                                   ; KEY_0 - KEY FUNCTION OFFSET
629    <#42> <#01>                                   ; KEY_1 - KEY FUNCTION OFFSET
630    <#52> <#02>                                   ; KEY_2 - KEY FUNCTION OFFSET
631    <#33> <#03>                                   ; KEY_3 - KEY FUNCTION OFFSET
632    <#43> <#04>                                   ; KEY_4 - KEY FUNCTION OFFSET
633    <#53> <#05>                                   ; KEY_5 - KEY FUNCTION OFFSET
634    <#34> <#06>                                   ; KEY_6 - KEY FUNCTION OFFSET
635    <#44> <#07>                                   ; KEY_7 - KEY FUNCTION OFFSET
636    <#54> <#08>                                   ; KEY_8 - KEY FUNCTION OFFSET
637    <#65> <#09>                                   ; KEY_9 - KEY FUNCTION OFFSET
638    <#70> <#0A>                                   ; KEY_POWER - KEY FUNCTION OFFSET
639    <#71> <#0B>                                   ; LOAD KEY
640    <#FF>                                         ; END OF TABLE MARKER
```

FIG. 6

```
700 SET_CDSET:
701     <CP8(1)><#PROG_KEY>                      ; COMPARE ADR1 WITH PROG_KEY
702     <IFF(1)>                                 ; IF NOT FLAG,
703        <JP(D)> <#RESET_H><RESET_L>           ;    JUMP TO RESET
704     <SWP(0,2)>                               ; SWAP ADR0 WITH ADR2
705     <LOOK8> <#KEY_TABLE_H><KEY_TABLE_L>      ; LOOKUP ADR0 AGAINST TABLE KEY_TABLE
706     <LESS8(1)> <#POWER_KEY>                  ; MAKE SURE SECOND DIGIT IS A DIGIT
707     <IFNF(1)>                                ; IF FLAG,
708        <JP(D)> <#RESET_H><RESET_L>           ;    JUMP TO RESET
709     <LOOK16> <#CODE_TABLE_H><#CODE_TABLE_L>  ; LOOKUP ADR0 AGAINST TABLE CODE_TABLE
710     <SWP(3,1)>                               ; MOVE ADDRESS OF CODESET IN ADR0 TO ADR3
711     <STOR(0)>                                ; STORE CODESET IN ADR3 INTO STORE0
712     <JP(D)><#RESET_H><#RESET_L>              ; RETURN TO MAIN LOOP

714 CODE_TABLE:
715     <#32> <NEC_CODE_H> <#NEC_CODE_L>         ; CODE 0 - PRELOADED IN MANUFACTURE
716     <#42> <SONY_CODE_H> <#SONY_CODE_L>       ; CODE 1 - PRELOADED IN MANUFACTURE
717     <#52> <ZENITH_CODE_H> <#ZENITH_CODE_L>   ; CODE 2 - PRELOADED IN MANUFACTURE
718     <#33> <THOMSON_CODE_H> <#THOMSON_CODE_L> ; CODE 3 - PRELOADED IN MANUFACTURE
719     <#43> <SMK_CODE_H> <#SMK_CODE_L>         ; CODE 4 - PRELOADED IN MANUFACTURE
720     <#53> <BAIRD_CODE_H> <#BAIRD_CODE_L>     ; CODE 5 - PRELOADED IN MANUFACTURE
721     <#52> <CODESET6_H> <#CODESET6_L>         ; CODE 6 (AUX2) USER DEFINED
722     <#33> <CODESET7_H> <#CODESET7_L>         ; CODE 7 (AUX3) USER DEFINED
723     <#43> <CODESET8_H> <#CODESET8_L>         ; CODE 4 (AUX4) USER DEFINED
724     <#53> <CODESET9_H> <#CODESET9_L>         ; CODE 5 (AUX5) USER DEFINED
725     <#FF>                                    ; END OF TABLE MARKER

726 AUX_TABLE:
727     <#KEY_SCAN>                              ; AUX(0) STARTING ADDRESS
728     <#UNUSED>                                ;
729     <#RC5_CDSET>                             ; AUX(2) STARTING ADDRESS
```

FIG. 7

```
800  RC5_CDSET:
801      <LD(1)>    <#RC5_SYS_H>  <#RC5_SYS_L>              ; LOAD POINTER TO SYS BITS
802      <LDK(2)>   <#RC5_DAT_H>  <#RC_DAT_L> <#06h>        ; LOAD POINTER TO DATA BITS
803      <CLDU>     <#RC5_H>      <#RC5_L>                  ; CALL RC5 FUNCTION
804      <RET>                                              ; RETURN

805  RC5_SYS:
806      <D4h>            ; EXTEND BIT= 1, SYSTEM CODE= 10101, THEN TWO TRAILING ZEROS

807  RC5_DAT:
808      <#...>           ; UPPER 6 BITS: KEY 0   LOWER 2 BITS: KEY 1
809      <#...>           ; UPPER 4 BITS: KEY 1   LOWER 4 BITS: KEY 2
810      <#XXXXXX00b>;    UPPER 2 BITS: KEY 2   LOWER 6 BITS: KEY 3
811      <#1101XXXXb>;    UPPER 6 BITS: KEY 4   LOWER 2 BITS: KEY 5
812      <#...>           ; UPPER 4 BITS: KEY 5   LOWER 4 BITS: KEY 6
813      <#...>           ; UPPER 2 BITS: KEY 6   LOWER 6 BITS: KEY 7
                            KEY 5 = 001101b
```

KEY CODE VALUES FOR THE VARIOUS KEYS ON THE REMOTE CONTROL DEVICE, KEY CODES DO NOT NECESSARILY LINE UP WITH THE BEGINNING OF THE BYTES

FIG. 8

```
900  MANCH:               ; SEND ONE BIT OF MANCHESTER ENCODED DATA
901      <LDBITI(1)>      ; GET BIT AND LOAD INTO FLAG, INCREMENT BIT POINTERS
902  MANCH_TOG:
903      <IFF(2)          ; IF FLAG=0 THEN
904          <WRM(0)>     ;     WRITE MARK WITH VALUE IN ADR0
905          <WRS(0)>     ;     WRITE SPACE WITH VALUE IN ADR0
906                       ; ELSE
907          <WRS(0)>     ;     WRITE SPACE WITH VALUE IN ADR0
908          <WRM(0)>     ;     WRITE MARK WITH VALUE IN ADR0
```

FIG. 9

```
1000  RC5:                                        ; RC5 PROTOCOL FUNCTION
1001  <SETMOD><#M-ON><#M-OFF>                     ; LOAD MOD INFO INTO TABLE
1002  <LD(0)><#HALF_BIT_TIME_H><#HALF_BIT_TIME_L> ; ADR0<=HALF BIT TIME
1003  <LD(3)><#MANCH_H><#MANCH_L>                 ; ADR3<=MANCHESTER FUNCTION
1004  <CLRC(3)(4)>                                ; WRITE EXTEND BIT (FIRST BIT OF SYSTEM CODE)
1005  <IFNMT(1)><01h>                             ; IF TOGGLE
1006      <SFLG>                                  ;     SET FLAG=1
1007      <JP(1)>                                 ; ELSE
1008      <RFLG>                                  ;     RESET FLAG=0
1009  <CLDC(3)><#MANCH_TOG_H><#MANCH_TOG_L>       ; WRITE TOGGLE BIT
1010  <LOOP(5)>                                   ; LOOP 5 TIMES FOR 5 SYSTEM CODE BITS
1011      <CLRC(3)(4)>                            ; CALL MANCHESTER TO WRITE ONE SYSTEM BIT
1012  <ENDLP>                                     ; ENDLOOP
1013  <SWP(1,2)>                                  ; SWAP ADR1 FOR ADR2 (DATA POINTER INTO ADR1)
1014  <LOOP(6)>                                   ; LOOP 6 TIMES FOR 6 DATA BITS
1015      <CLRC(3)(4)>                            ; CALL MANCHESTER TO WRITE ONE DATA BIT
1016  <ENDLP>                                     ; ENDLOOP
1017  <WRS(D)><#FRAME_SPACE_H><#FRAME_SPACE_L>    ; WRITE FRAME SPACE TIME
1018  <EORF(0)>                                   ; END OF REPEAT FRAME - INFINITE REPEAT
1019  <EOT>                                       ; END OF TRANSMISSION
1020  <RET>                                       ; RETURN FUNCTION
```

FIG. 10

```
1100  LOAD_CODE:
1101  <AUX(0)>                                    ; DO A KEY SCAN
1102  <CP8(0)> <#00>                              ; CHECK FOR NO KEYS PRESSED
1103  <IFNF(1)>                                   ; IF FLAG,
1104      <JP(D)> <#RESET_H> <#RESET_L>           ;    JUMP TO RESET
1105  <CP8(0)> <#02>                              ; CHECK FOR TWO KEYS PRESSED
1106  <IFF(1)>
1107      <JP(D)> <#LOAD_CODE_H> <#LOAD_CODE_L>;    JUMP BACK TO LOAD_CODE
1108  <CP8(1)> <#LOAD_KEY>                        ; COMPARE ADR1 WITH LOAD_KEY
1109  <IFF(1)>                                    ; IF FLAG,
1110      <JP(D)> <#RESET_H> <#RESEST_L>          ; IF FIRST KEY IS NOT LOAD, THEN RESET
1111  <SWP(0,2)>                                  ; SWAP ADR0 WITH ADR2
1112  <LOOK8> <#KEY_TABLE_H> <#KEY_TABLE_L>       ; LOOKUP ADR0 AGAINST KEY_TABLE
1113  <LESS8(1)> <POWER_KEY>                      ; MAKE SURE THAT SECOND KEY IS A DIGIT
1114  <IFNF(1)>                                   ; IF FLAG,
1115      <JP(D)><#RESET_H><#RESET_L>             ;    JUMP TO RESET
1116  <SWP(0,1)>                                  ; PUT OFFSET INTO ADR0
1117  <PUSH(0)>                                   ; PUSH OFFSET ONTO STACK TO SAVE IT
1118  <LDSAUX>                                    ; USES ADR0 ("2") AND LOADS AUX CODE INTO AUX2
1119  <POP(0)>                                    ; POP OFFSET BACK OFF STACK
1120  <ADD(0)><#04>                               ; ADD "4" TO DIGIT OFFSET ("2"), PUT "6" INTO ADR0
1121  <LOOK16><#CODE_TABLE_H><#CODE_TABLE_L>      ; USES "6" TO LOOK UP, RETURN CODESET6
1122  <SWP(1,3)>                                  ; MOVE CODESET6 ADDRESS INTO ADR3
1123  <STOR(0)>                                   ; STORE ADR3 (CODESET6 ADDRESS) INTO STORE0
1124  <JP(D)> <#RESET_H> <#RESET_L>               ; RETURN TO MAIN LOOP
```

FIG. 11

| GLOBAL REGISTER NAME | # OF BITS | DESCRIPTION |
| --- | --- | --- |
| SPC | 16 | VIRTUAL PROGRAM COUNTER POINTER |
| SSP | 16 | VIRTUAL STACK POINTER |
| BSTK | 8 | BIT STACK |
| ADR0 | 16 | VIRTUAL REGISTER ADR0 |
| ADR1 | 16 | VIRTUAL REGISTER ADR1 |
| ADR2 | 16 | VIRTUAL REGISTER ADR2 |
| ADR3 | 16 | VIRTUAL REGISTER ADR3 |
| OBYT | 8 | OFFSET FOR BYTES - USED IN THE INSTRUCTION SET |
| OBIT | 8 | OFFSET FOR BITS - USED IN THE INSTRUCTION SET |
| TOG | 7 | TOGGLE COUNTER (INCREMENTS EVERY TIME A KEY IS PRESSED) |
| FLAG | 1 | CONDITION FLAG |
| KEY | 8 | KEY OFFSET - IDENTIFIES A KEY RELATIVE TO THE FIRST KEY |
| STORE0 | 16 | GENERAL PURPOSE STORAGE |
| STORE1 | 16 | GENERAL PURPOSE STORAGE |
| STORE2 | 16 | GENERAL PURPOSE STORAGE |
| STORE3 | 16 | GENERAL PURPOSE STORAGE |
| STORE4 | 16 | GENERAL PURPOSE STORAGE |
| STORE5 | 16 | GENERAL PURPOSE STORAGE |
| STORE6 | 16 | GENERAL PURPOSE STORAGE |
| STORE7 | 16 | GENERAL PURPOSE STORAGE |

FIG. 12

INSTRUCTION SET OPCODES

FIRST NIBBLE OF INSTRUCTION CODE

| SECOND NIBBLE | 0 | 1 | 2 | 3 | 4 | 5 | 6 | 7 |
|---|---|---|---|---|---|---|---|---|
| 0 | WMS(1) | SETMOD | WRM(0) | LD(0) | CLRU(2) | CLDU | CLDU | LOOP(16) |
| 1 | WMS(2) | EOF | WRM(1) | LD(1) | CLRC(2)(1) | CLDC(1) | ADD(0) | ENDLP |
| 2 | WMS(3) | EOT | WRM(2) | LD(2) | CLRC(2)(2) | CLDC(2) | ADD(1) | LOOP(2) |
| 3 | WMS(4) | STOP | WRM(3) | LD(3) | CLRC(2)(3) | CLDC(3) | SUB(0) | LOOP(3) |
| 4 | WMS(5) | SEND(U) | WRS(0) | LDO(0) | CLRC(2)(4) | CLDC(4) | SUB(1) | LOOP(4) |
| 5 | WMS(6) | SEND(L) | WRS(1) | LDO(1) | CLRC(2)(5) | CLDC(5) | LDK(0) | LOOP(5) |
| 6 | WMS(7) | ABORT | WRS(2) | LDO(2) | CLRC(2)(6) | CLDC(6) | LDK(1) | LOOP(6) |
| 7 | WMS(8) | IFSND | WRS(3) | LDO(3) | CLRC(2)(7) | CLDC(7) | LDK(2) | LOOP(7) |
| 8 | WMS(9) | EORF(0) | POP(0) | PLD(0) | CLRU(3) | LDBT(0) | LDK(3) | LOOP(8) |
| 9 | WMS(10) | EORF(1) | POP(1) | PLD(1) | CLRC(3)(1) | LDBT(1) | SWP(0,1) | LOOP(9) |
| A | WMS(11) | EORF(2) | POP(2) | PLD(2) | CLRC(3)(2) | LDBTI(0) | SWP(0,2) | LOOP(10) |
| B | WMS(12) | EORF(3) | POP(3) | PLD(3) | CLRC(3)(3) | LDBITI(1) | SWP(0,3) | LOOP(11) |
| C | WMS(13) | EORF(4) | INCTOG | PLDO(0) | CLRC(3)(4) | PSHB | SWP(1,2) | LOOP(12) |
| D | WMS(14) | EORF(5) |  | PLDO(1) | CLRC(3)(5) | POPB | SWP(1,3) | LOOP(13) |
| E | WMS(15) | EORF(6) | WRM(D) | PLDO(2) | CLRC(3)(6) | SFLG | SWP(2,3) | LOOP(14) |
| F | WMS(16) | EORF(7) | WRS(D) | PLDO(3) | CLRC(3)(7) | RFLG | RET | LOOP(15) |

FIRST NIBBLE OF INSTRUCTION CODE

| SECOND NIBBLE | 8 | 9 | A | B | C | D | E | F |
|---|---|---|---|---|---|---|---|---|
| 0 | IFF(D) | LESS8(0) | MSK(0) | JP(D) | STOR(0) | AUX(0) | LDALL | RESTART |
| 1 | IFF(1) | LESS8(1) | MSK(1) | JP(1) | STOR(1) | AUX(1) | LDSAUX(1) | DIRECT |
| 2 | IFF(2) | LESS8(2) | MSK(2) | JP(2) | STOR(2) | AUX(2) | LDSAUX(2) | MEMRAM |
| 3 | IFF(3) | LESS8(3) | MSK(3) | JP(3) | STOR(3) | AUX(3) | LDSAUX(3) | MEMPRG |
| 4 | IFF(4) | LESS16(0) | MSK(K) | JP(4) | STOR(4) | AUX(4) | LDSAUX(4) | TRST |
| 5 | IFF(5) | LESS16(1) | MSK(T) | JP(5) | STOR(5) | AUX(5) | LDSAUX(5) | ID |
| 6 | IFF(6) | LESS16(2) | CFLG | JP(6) | STOR(6) | AUX(6) | LDSAUX(6) | DUMP |
| 7 | IFF(7) | LESS16(3) |  | JP(7) | STOR(7) | AUX(7) | LDSAUX(7) | SBRK |
| 8 | IFNF(D) | CP8(0) | SETK(0) | JP(8) | RTRV(0) | AUX(8) | LDAUX(8) | RBRK |
| 9 | IFNF(1) | CP8(1) | SETK(1) | JP(-1) | RTRV(1) | AUX(9) | LDAUX(9) | RUN |
| A | IFNF(2) | CP8(2) | SETK(2) | JP(-2) | RTRV(2) | AUX(10) | LDAUX(10) | ADDR |
| B | IFNF(3) | CP8(3) | SETK(3) | JP(-3) | RTRV(3) | AUX(11) | LDAUX(11) | LDAUX |
| C | IFNF(4) | CP16(0) | LOOK8 | JP(-4) | RTRV(4) | AUX(12) | LDAUX(12) | LDSAUX |
| D | IFNF(5) | CP16(1) | LOOK16 | JP(-5) | RTRV(5) | AUX(13) | LDAUX(13) | EAUX |
| E | IFNF(6) | CP16(2) | CASE8 | JP(-6) | RTRV(6) | AUX(14) | LDAUX(14) | ESAUX |
| F | IFNF(7) | CP16(3) | CASE16 | JP(-7) | RTRV(7) | AUX(15) | LDAUX(15) | EXTEND |

■ INDICATES PROTECTED

▓ INDICATES LEVEL 3

FIG. 13

MARK TIMES: 0562
SPACE TIMES: 10B4, 26CD, 4000
STRING OF TIMING
INFORMATION:    00, 71, 71, 70, 70, 71, 70, 71, 71, 70, 72, 83

|←———————— START FRAME, SENT ONCE ————————→|← REPEAT FRAME →|

MARK TIMES: 1153, 0113
SPACE TIMES: 08CA, 0113, 0375, 5118, 0463, B8E8
STRING OF TIMING
INFORMATION:    00, 11, 71, 71, 71, 72, 71, 71, 71, 72, 72, 72, 72,
                71, 72, 72, 72, 72, 71, 71, 71, 72, 71, 71, 71, 71,
                72, 72, 72, 71, 72, 72, 73, 82, 04, 15, C0, 83

|←———— REPEAT FRAME ————→|←———— REPEAT FRAME ————→|

MARK TIMES: 06FF, 0195
SPACE TIMES: 0677, 01AF, 04F4, 4943
STRING OF TIMING
INFORMATION:    00, 11, 71, 71, 71, 71, 71, 71, 71, 71, 71, 72,
                72, 72, 72, 72, 72, 72, 71, 73, C0, 83

GENERATING A MARK/SPACE TABLE AND A STRING OF TIMING INFORMATION ON A REMOTE CONTROL DEVICE

CROSS REFERENCE TO RELATED APPLICATIONS

This application is a continuation in part of, and claims priority under 35 U.S.C. §120 from, nonprovisional U.S. patent application Ser. No. 10/777,023 entitled "Interactive Web-Based Codeset Selection and Development Tool," filed on Feb. 10, 2004, the subject matter of which is incorporated herein by reference.

This application claims the benefit under 35 U.S.C. §119 of provisional application Ser. No. 60/576,941, entitled "A Compact Register-Based Virtual Machine And Its Use On Resource-Constrained Devices", filed Jun. 3, 2004. The subject matter of provisional application Ser. No. 60/576, 941 is incorporated herein by reference.

CROSS REFERENCE TO COMPACT DISC APPENDIX

The Compact Disc Appendix, which is a part of the present disclosure, is one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

The present invention relates generally to the programming and control of inexpensive resource-constrained devices such as, for example, IR remote control devices and devices including embedded inexpensive microcontrollers.

BACKGROUND

Electronic consumer devices (for example, televisions, radios, digital video disk (DVD) players, video cassette recorders (VCRs), sound systems, home entertainment systems, video game controllers, set-top boxes, personal computers) and home appliances (for example, ceiling fans, lights, alarm systems, garage door openers, kitchen appliances, heating controls) are often controllable by one or more remote control devices. Such a remote control device is often a handheld device with a set of keys and a transmitter (for example, an infrared (IR) transmitter).

Each device to be controlled recognizes and responds to a particular set of incoming codes communicated on a carrier. Information describing one such set of codes is sometimes called a codeset. A particular television may, for example, respond to codes of one codeset, whereas a particular DVD player may respond to codes of a different codeset. One or more codesets are therefore typically stored on a remote control device so that the remote control device can control one or more types of devices.

The format in which such codeset information is stored on a remote control device is typically compressed so that it consumes as little memory space as is practical. The format of the compacted information may be proprietary and/or may be difficult to decipher to one not aware of the format. Not only can the codeset information be difficult to decipher, but the mechanism used to read the codeset information and to generate the actual code transmitted can also be difficult to decipher. The mechanism may, for example, involve machine code that exercises function-specific hardware. The mechanism on a first type of remote control device may differ from the mechanism performing the same function on a second type of remote control device. For these and other reasons, the programming of remote control devices can be quite involved and can involve accessing proprietary information. It generally requires the knowledge of the hardware platform of the remote control device. There are different types of remote control devices, and code from one remote control device cannot simply be transferred to another type of remote control device.

Some remote control devices are relatively expensive devices that have a significant amount of processing power, memory and other hardware resources. A typical cell phone is one such device that has substantial resources and that executes an operating system. A typical personal digital assistant (PDA) is another such device that has substantial resources and has an operating system.

In one example, the PDA executes the PalmOS operating system and is a Java Virtual Machine (JVM). The JVM provides just-in-time interpretation of Java bytecode scripts into native machine code. The PDA provides the hardware and other functionality to support a standard set of Java application programming interfaces (API). When the Java bytecode is interpreted, the resulting native machine code may call an API such that the API returns values or causes certain functions to be performed. If two JVM PDAs both support the same set of APIs, then a Java bytecode script that uses these Java APIs can be made to run on both platforms without modification.

Although the JVM and PalmOS scripting language and interpreter mechanism may be appropriate for certain classes of expensive platforms like PDAs, the JVM and PalmOS mechanism consumes too much memory and processor resources to be used on other classes of platforms. The sale price of many remote control devices is extremely cost sensitive. A remote control device may, for example, be provided with an electronic consumer device and may almost be a throw-away device. A processor that is as inexpensive as practical is used to implement remote control functionality. The amount of both program memory and data memory included is kept as low as possible and is typically a fraction of the amount of program memory and data memory available in a PDA. In the class of inexpensive remote control devices, there is typically no operating system. The programming of the processor is often handcrafted to reduce the amount of memory space consumed. Codeset information needed to generate codes to operate electronic consumer devices is generally compressed and stored in obscure memory-efficient formats. A program in such a remote control device cannot therefore be ported from one type of device to another. The program is generally not easily understandable by anyone not intimately familiar with the way the code was written and the particular hardware platform on which it operates. A novel scripting language and associated script interpreter are sought, whereby the interpreter interprets scripts into machine code of a processor in a microcontroller of limited memory and computing power.

SUMMARY

An inexpensive device (for example, an IR remote control device) has a bidirectional communication link (for example, an IR receiver and an IR transmitter). The processor of the device is an 8-bit microcontroller having no more than 64 k bytes of program memory, and no more than 4 k bytes of random access memory (RAM). The processor does not execute a real-time operating system. The processor does, however, implement a compact, register-based, 8-bit virtual machine. The compact virtual machine interprets scripts written in accordance with a novel compact, low-level, scripting language. The virtual machine includes a script interpreter, a loader API functionality, a receiver API functionality, a transmitter API functionality, and an execute script direct API functionality.

A general-purpose device with the virtual machine including the API functionalities is manufactured in volume. To customize the device for a particular application, an additional API functionality not initially on the device can later be loaded into the device via the bidirectional link. The additional API functionality allows a script to exercise or use particular hardware and/or input/output (I/O) capabilities of the underlying hardware platform. The API functionality loaded is, in one embodiment, an amount of low-level machine code made up of instructions of the instruction set of the processor. Using this technique, APIs can access and use any hardware capabilities of the underlying processor including, for example, a timer, a register such as a control register or a diagnostic register, an analog-to-digital converter, a digital-to-analog converter, a display, a digital output terminal, a digital input terminal, and a bus controller or bus interface. In another embodiment, the later-loaded API functionality is an amount of script written in the novel script language understood by the virtual machine. Regardless of the type of API functionality, the code of the API functionality can be received onto the device by the receiver API functionality or by a digital input terminal, and can be loaded into program memory. The loaded API functionality is assigned an identifier. Once loaded, a script being interpreted by the script interpreter can invoke and exercise the API functionality using this identifier. Using this technique, APIs can access and use any hardware capabilities of the underlying processor including, for example, a timer, an register such as a control register or a diagnostic register, an analog-to-digital converter, a digital-to-analog converter, a display, a digital output terminal, a digital input terminal, and a bus controller or bus interface. In another embodiment, the later-loaded API functionality is an amount of script written in the novel script language understood by the virtual machine. Regardless of the type of API functionality, the code of the API functionality can be received onto the device by the receiver API functionality or by a digital input terminal, and can be loaded into program memory. The loaded API functionality is assigned an identifier. Once loaded, a script being interpreted by the script interpreter can invoke and exercise the API functionality using this identifier.

To further customize the device, a script can be loaded into the device via the bidirectional link. The code of the script is received onto the device by the receiver API functionality, and is loaded into program memory. The script, when interpreted by the script interpreter, can call the various API functionalities supported, including the API functionalities downloaded into the device over the bidirectional link as set forth above. The script, once loaded into the program memory of the device, is interpreted by the script interpreter. Interpretation of the script causes the device to perform a custom function.

In yet another embodiment, the device is an IR remote control device with a processor. The processor is a Z8 Encore microcontroller available from Zilog, Inc. of San Jose, Calif. To enable the remote control device to control a particular electronic consumer device (for example a particular television that responds to IR commands of a particular codeset), a script is loaded into the remote control device. The script, when executed, causes the keys of the remote control device to be scanned to detect any keys that might have been pressed. If a key is detected to have been pressed, then the script causes an appropriate command code operational signal of an appropriate codeset to be transmitted from the remote control device. The command code operational signal, when received by the electronic consumer device, causes the electronic consumer device to perform a function that corresponds to the key that was pressed. If, for example, the power key on the remote control device was detected to have been pressed, then the command code operational signal for the power key is transmitted to the television thereby causing the television to toggle on or off.

The information that enables the remote control device to output command code operational signals of one codeset as opposed to command code operational signals of a different codeset is embedded into the script. Accordingly, a second remote control device identical to the first remote control device can be loaded with API functionality and a second script such that the second remote control will work with a different electronic consumer device (for example, a second television that responds to IR command codes of a second codeset). Rather than loading the first script that facilitates communication with the first television, a second script is loaded that facilitates communication with the second television. Manufacturing and inventory control is therefore simplified because general-purpose remote control devices can be produced in greater volumes. Customized scripts are simply loaded into general-purpose remote control devices in order to make the remote control devices function with one type of electronic consumer device or another.

In yet another embodiment, the compact virtual machine with the bidirectional link and the loader API functionality converts a simple inexpensive remote control device into a flexible, reprogrammable, general-purpose platform. The script within the remote control device is customizable. It can be overwritten and/or modified without making any hardware changes to the remote control device. Scripts and/or API functionalities can be added to the remote control devices in the factory and/or in the field.

Not only can identical remote control devices be loaded with different scripts, but a script can be interpreted by a virtual machine running on any one of multiple different hardware platforms. In one example, all the different members of a family of microcontrollers are programmed using the same scripting language. All the members of the family realize the same virtual machine. Although these different members may have different hardware capabilities and features and may have some different API functionalities, a great deal of the controlling software is common due to the use of the same scripting language and same virtual machine. The common portion of script, once written, can be ported from one virtual machine platform to the next without having to be retested or requalified. Significant commonalties and savings results.

In a first aspect, a mark/space table and a string of timing information is generated on a remote control device when a command on the remote control device is chosen. The command may, for example, be chosen when a key on the remote control is pressed. The command is associated with a function of an electronic consumer device. The mark/space table contains a mark time and a space time associated with a codeset, and the codeset includes a command code corresponding to the command. When the remote control device detects that the command is chosen, the mark/space table is generated along with a string of timing information that references mark times and space times in the mark/space table. Once the mark/space table and the string of timing information are generated, the mark/space table and the string of timing information are used to generate an operational signal such that the command code is encoded in the operational signal. The operational signal is received by the electronic consumer device and causes the electronic consumer device to perform the function associated with the command that was chosen.

In one example of the first aspect, a mark/space table includes a first N-bit value that describes a mark time and a second N-bit value that describes the space time. A string of timing information includes a string of M-bit indices. A first M-bit index points to the first N-bit value, and a second M-bit index points to the second N-bit value. As opposed to representing the string of timing information as a plurality of N-bit values, the string is represented as a plurality of M-bit indices that point to N-bit values in the mark/space table. The string of timing information is stored in less memory where N is larger than M. The mark time and the space time are used to modulate or encode a keycode (in this case a keycode is a command code associated with a specific key) onto an operational signal, wherein the keycode corresponds to a function of an electronic consumer device.

In a second aspect, a script is interpreted on a remote control device to generate a mark/space table and a string of timing information. The script contains codeset information and is interpreted when a first key is pressed on the remote control device. The first key corresponds to a first function of an electronic consumer device. The mark/space table and the string of timing information are then used to generate an operational signal. The operational signal causes the electronic consumer device to perform the first function. When a second key is pressed on the remote control device, the script is interpreted a second time thereby generating a second mark/space table and a second string of timing information. The second mark/space table and the second string of timing information are then used to generate a second operational signal. The second operational signal is received by the electronic consumer device and causes the electronic consumer device to perform a second function corresponding to the second key that was pressed on the remote control device.

In one example of the second aspect, a remote control device includes a microcontroller and a script interpreter. A script is stored in a memory on the microcontroller. The script contains codeset information of a codeset associated with an electronic consumer device. The script interpreter interprets the script to generate a mark/space table and a string of timing information. The mark/space table and the string of timing information is then used to generate an operational signal and the operational signal is transmitted from the remote control device.

In another example of the second aspect, the codeset information includes a keycode. The keycode is a digital number that indicates a key on the remote control device. The script interpreter outputs a string of marks and spaces that represents the keycode. In this example, the string of marks and spaces has two adjacent marks. The remote control device includes a level one builder that receives the string of marks and spaces from the script interpreter and determines a combined mark time with a duration equal to a combined duration of the two adjacent marks. The level one builder generates a mark/space table that contains the combined mark time. The level one builder also generates a string of timing information that references the combined mark time as opposed to referencing two smaller mark times. The mark/space table and the string of timing information generated by the level one builder is then used to generate an operational signal.

In a third aspect, a script block is called by both a first upper-level script and by a second upper-level script. The first upper-level script contains first data, and the second upper-level script contains second data. When the script block is called by the first upper-level script, the first data is encoded so as to conform to a common protocol. When the script block is called by the second upper-level script the second data is encoded so as to conform to the common protocol. The interpreting is performed on an 8-bit microcontroller with less than seventy kilobytes of memory. No compiler or operating system is present on the microcontroller.

In one example of the third aspect, interpreting the script block generates strings of mark times and space times that are consistent with a common protocol. When the script block operates on the first data, for example, a first string of mark times and space times is output that is consistent with the common protocol. When the script block operates on the second data, for example, a second string of mark times and space times is output that is consistent with the common protocol. The common protocol may, for example, be a common protocol for encoding digital bits, wherein the first data is a first keycode and where the second data is a second keycode. The first string of mark times and space times is converted into a first mark/space table and a first string of timing information. The first mark/space table and the first string of timing information are then used to generate a first operational signal. The first operational signal controls a first function of an electronic consumer device corresponding to the first keycode. The second string of mark times and space times is converted into a second mark/space table and a second string of timing information. The second mark/space table and the second string of timing information are then used to generate a second operational signal. The second operational signal controls a second function of an electronic consumer device corresponding to the second keycode.

In another example of the third aspect, a microcontroller includes a memory and a script interpreter. A first upper-level script, a second upper-level script and a script block are stored in the memory. First data is associated with the first upper-level script, and second data is associated with the second upper-level script. The script block implements a common protocol. When the script block is called by the first upper-level script and the second upper-level script, the script interpreter interprets the script block, and both the first data and the second data are output in accordance with the common protocol. No compiler or operating system is present on the microcontroller.

In a fourth aspect, a machine code application programming interface (API) is loaded onto a remote hardware platform to enable new functionality. The API is an amount of machine code that is loaded into the remote hardware platform such that the machine code API can be called by a script instruction interpretable by a script interpreter.

In one example of the fourth aspect, a first device has a first eight-bit processor with a first instruction set. A first script is stored in the first device. A first script interpreter executes on the first eight-bit processor and interprets the first script. An amount of machine code that is executable on the first eight-bit processor is loaded into the first device after the first script interpreter has already been executing on the first eight-bit processor. The first script calls the amount of machine code such that the amount of machine code is executed by the first eight-bit processor. A second device has a second eight-bit processor with a second instruction set different from the first instruction set. A second script interpreter executes on the second eight-bit processor. A second script identical to the first script is interpreted by the second script interpreter. The second script includes the same script instruction identical to the script instruction in the first script that resulted in the call of the amount of machine code that was executed by the first eight-bit processor. Interpreting on the second device of this identical script instruction, however, results in a call to an amount of machine code that is executed by the second eight-bit processor. This amount of machine code is coded in accordance with the second instruction set.

In another example of the fourth aspect, an integrated circuit includes an eight-bit processor, a memory that stores a script interpreter, and a loader functionality. The loader functionality is operable to cause an amount of machine code to be loaded into the integrated circuit. The script interpreter interprets in accordance with a scripting language. Interpreting an instruction in the scripting language causes execution by the processor of the amount of machine code.

In a fifth aspect, an eight-bit, register-based virtual machine is realized on an eight-bit processor platform. The eight-bit processor platform has no more than 64 kilobytes of program memory and no more than 4 kilobytes of random access memory (RAM). In one embodiment, the eight-bit processor platform is a remote control device for controlling an electronic consumer device or a home appliance. In another embodiment, the eight-bit processor platform performs monitoring and/or control functions in a larger device.

In one example of the fifth aspect, a remote control device for controlling an electronic consumer device includes a transmitter, an eight-bit processor and a script. The eight-bit processor executes a set of instructions that implements an eight-bit virtual machine, which in turn interprets the script. Interpreting the script causes an operational signal to be transmitted from the transmitter. The electronic consumer device is responsive to a command code communicated in the operational signal.

In another example of the fifth aspect, a virtual machine is realized on a remote control device. The virtual machine is an eight-bit, register-based virtual machine. A script is downloaded into the remote control device and interpreted. The remote control device has no operating system. Interpreting the script causes an operational signal to be transmitted from the remote control device. In one embodiment, the remote control device has an infrared transmitter, and the operational signal is an infrared signal.

In a sixth aspect, a script is sent via a secure communication link to a virtual machine for immediate execution. A script interpreter executes on an eight-bit microcontroller. A script instruction is received onto the eight-bit microcontroller from an external source via the secure communication link. The external source is authenticated prior to allowing the script instruction to be interpreted. Individual script instructions may be sent to the virtual machine and interpreted, one by one, in this fashion over the secure communication link. The individual script instructions, when interpreted, may cause information stored on the virtual machine to be output over the secure communication link. The reporting of information in this fashion may be used in debugging or in monitoring and control applications.

In one example of the sixth aspect, an apparatus includes an eight-bit processor, a memory and an execute script direct functionality. A script interpreter and a script are stored in the memory. The script interpreter executes on the eight-bit processor and interprets the script. A script instruction is received onto the apparatus when the script is being interpreted. The execute script direct functionality causes the script instruction to be interpreted by the script interpreter.

In a seventh aspect, a script interpreter interprets a first script instruction and causes the interpreting to jump from a first location in a script to a second location in the script. The first script instruction is disposed at the first location, and a second script instruction is disposed at the second location. The second location is identified by the first script instruction. After the jump the script interpreter sequentially interprets a predetermined number of script instructions, starting with and including the second script instruction. After the predetermined number of script instructions has been interpreted, the interpreting of script instructions automatically returns to a third location. The third location is the location that immediately follows the first location.

In one example of the seventh aspect, a first portion of script is provided, which causes a device to output an operational signal in accordance with a first protocol. The first portion of script contains a first "call relative counted" (CLRC) script instruction. A second portion of script is provided, which causes the device to output a second operational signal in accordance with a second protocol. The second portion of script contains a second CLRC script instruction. The first CLRC script instruction causes a first jump to a third portion of script such that a first predetermined number of script instructions of the third portion are interpreted. The first CLRC script instruction then automatically causes a first return jump back to the first portion. The second CLRC script instruction causes a second jump to the third portion of script such that a second predetermined number of script instructions of the third portion are interpreted. The second CLRC script instruction then automatically causes a second return jump back to the second portion.

In another example of the seventh aspect, a virtual machine includes a memory and a means for interpreting a CLRC script instruction. The means includes an eight-bit processor. When the means is interpreting script instructions, the CLRC script instruction is communicated to the virtual machine across a communication link. After the CLRC script instruction is communicated to the virtual machine, the virtual machine suspends any other script interpreting and immediately interprets the CLRC script instruction.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 6-11 set forth a script that is interpreted by the virtual machine of FIG. 1.

FIG. 12 is a diagram that sets forth the global registers of the virtual machine of FIG. 1.

FIG. 13 is a diagram setting forth the opcodes of the script instructions interpreted by the virtual machine of FIG. 1.

DETAILED DESCRIPTION

Reference will now be made in detail to some embodiments of the invention, examples of which are illustrated in the accompanying drawings.

Figure 1:
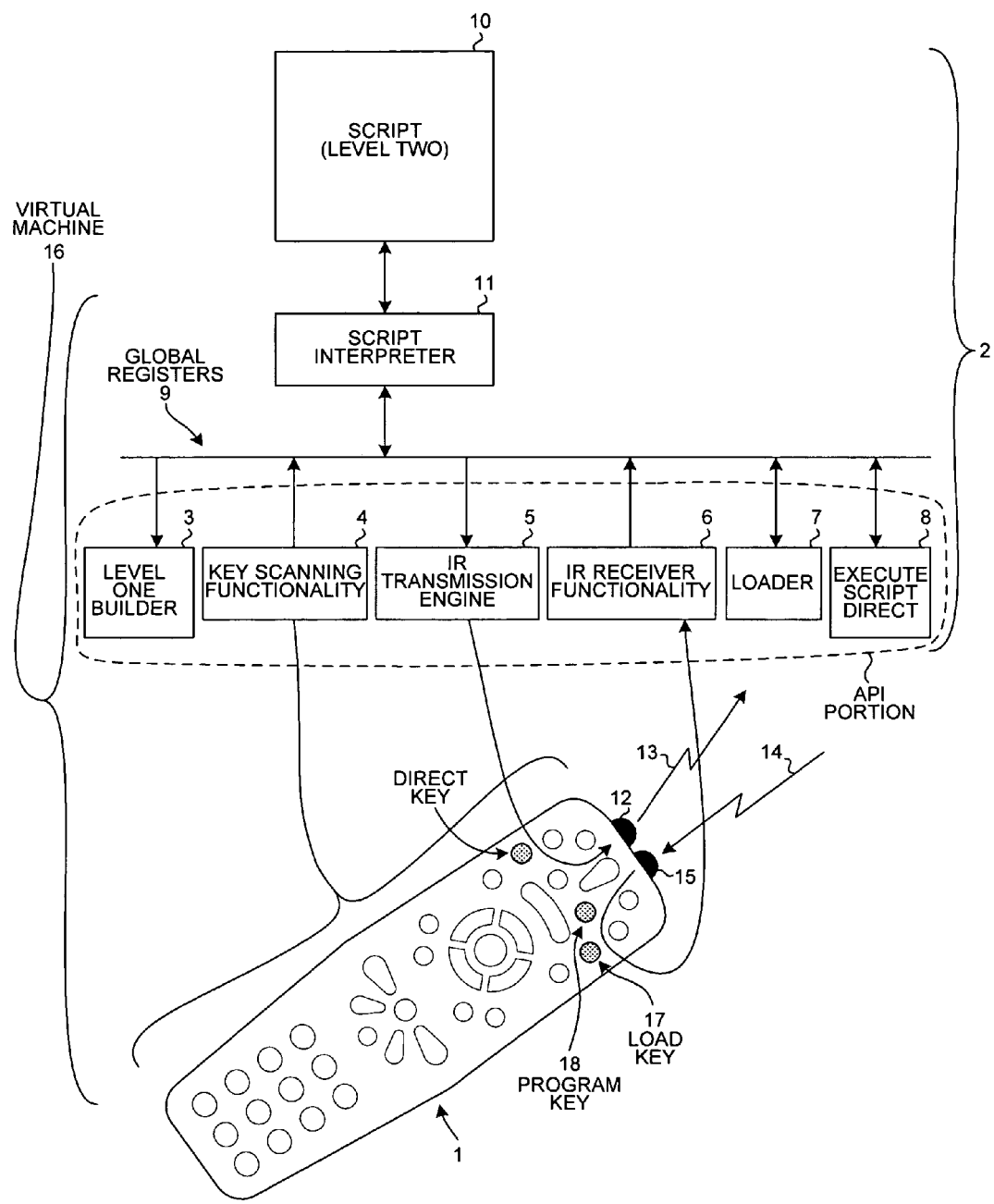
FIG. 1 is a schematic diagram that shows a remote control device, as well as the structure of software executing on the remote control device.

FIG. 1 is a schematic diagram that shows a remote control device 1, as well as the structure of software 2 executing on the remote control device. Remote control device 1 includes a microcontroller or other processor that executes code stored in a memory on remote control device 1. Software 2 in combination with hardware of remote control device 1 implements several application programming interface (API) functions. An API portion of software 2 includes a level one builder functionality 3, a key-scanning API functionality 4, an infrared (IR) transmission engine functionality 5, an IR receiver functionality 6, a loader API functionality 7, and an execute script direct functionality 8.

When a key on remote control device 1 is pressed, information indicative of which key was pressed is reported by key scanning functionality 4 into an associated one of global registers 9. Key scanning functionality 4 is a combination of software and hardware. Operation of key scanning functionality 4 is explained in further detail below. In one example, IR transmission engine functionality 5 is a software subroutine executed by the microcontroller of remote control device 1.

A script 10 is stored in memory on remote control device 1. Script 10 is interpreted instruction-by-instruction by script interpreter 11. Script 10 may, for example, determine which key was pressed by reading the contents of the global register into which key scanning functionality 4 placed the information indicative of which key was pressed. Interpretation of script 10 may also, for example, cause remote control device 1 to transmit a keycode of a codeset from an IR transmitter 12. The keycode is modulated onto an IR carrier signal and is transmitted in the form of an operational signal 13. Digital values are modulated onto operational signal 13 using a modulation technique defined by the particular transmission protocol used by the codeset that controls an electronic consumer device (for example, a television). The IR operational signal 13 is received by the electronic consumer device and causes the electronic consumer device to perform a desired function. The keycode may, for example, be a POWER-ON code that causes the television to turn on.

To cause remote control device 1 to output operational signal 13, script 10 calls functions of the level one builder 3 such that level one builder 3 builds a mark/space table and generates a string of timing information. The string of timing information is a string of N-bit indices that point to specific locations in the mark/space table and thereby designate the durations and sequence of marks and spaces in operational signal 13. The mark/space table and the string of timing information contain information on how to generate operational signal 13. In some types of encoding, digital ones and zeros are characterized by pairs of marks and spaces. One mark/space pair represents a digital zero, and another mark/space pair represents a digital one. In these encoding types, a space always follows a mark. For each codeset, the marks and spaces for each digital pair have predefined lengths. For example, for pulse position modulation A (PPMA), the mark length for a digital zero and a digital one is the same, but the space lengths are different. For pulse width modulation B (PWMB), the combined length of the pulse and space for both a digital zero and a digital one are the same, but the length of the pulse and space are different.

In other encoding types, one space can be followed by another space, or a mark is followed by another mark. For PPMC encoding, a digital one is represented by a mark/space pair, but a digital zero is represented by only a space. Thus, a space can follow another space. With Manchester encoding, a mark can follow another mark, and a space can follow another space. For encoding types where one mark can follow another mark, and one space can follow another space, level one builder 3 builds a mark/space table that also contains the durations of all combined mark/mark and space/space lengths used by the keycode. It is even possible that a keycode would contain three or more adjacent marks or spaces in some encoding types.

Once the mark/space table and the string of timing information is created, script 10 calls a SEND function on IR transmission engine 5. IR transmission engine 5 is a combination of software and hardware. IR transmission engine 5 retrieves the information in the mark/space table and the string of timing information and uses it to generate operational signal 13. Thus, the API portion of software 2 together with the script interpreter 11 function as a signal engine to generate operational signal 13.

In addition to transmitting signals, remote control device 1 can also receive an incoming communication 14 via IR receiver 15. Information in communication 14 is received and decoded by IR receiver functionality 6. This may, for example, involve synchronizing onto a bit stream in the communication, and then clocking a sequence of payload bits into a register, and then performing error detection on the payload bits. If the payload bits meet the error detection test, then the IR receiver functionality 6 writes the payload bits in form of bytes into a predetermined location in memory known to loader 7. Script 10 and loader 7 can access the payload bits to determine what information was contained in the incoming communication 12 and to take appropriate action.

Level one builder 3, key scanning functionality 4, infrared (IR) transmission engine 5, IR receiver functionality 6, loader 7, execute script direct functionality 8, script interpreter 11, and the associated underlying hardware platform together form a virtual machine 16. Script 10 can execute on this virtual machine. The very same script 10 can execute on a different platform involving a different microcontroller or processor and a different memory structure provided that the API portion of software 2 (the API functions of blocks 3-8) are provided to the other platform. A hardware platform can be customized by loading API functionality not initially on the device via a bidirectional link. In this way, a signal engine for generating operational signal 13 can be sent to a remote hardware platform, such as a remote control device or a cellular phone, by transmitting the API portion of software 2 together with the script interpreter 11 to the remote hardware platform.

Figure 2:
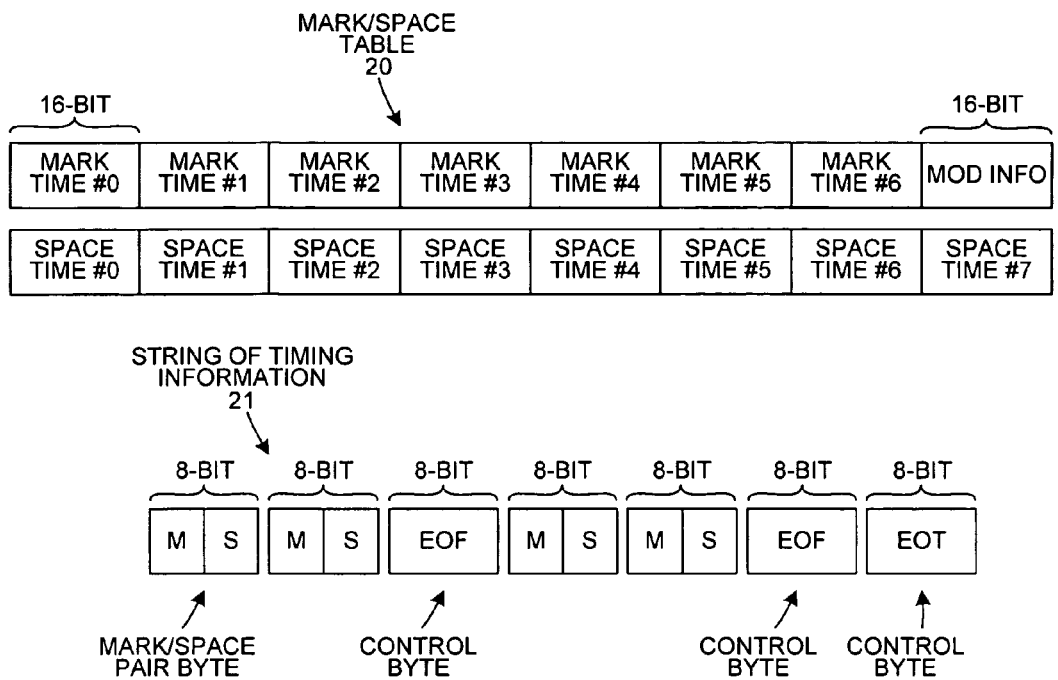
FIG. 2 illustrates operation of the IR transmission engine of FIG. 1 in connection with a mark/space table and a string of timing information.

Mark/Space Table and String of Timing Information:

FIG. 2 illustrates operation of IR transmission engine 5 in connection with a mark/space table 20 and a string of timing information 21. The top row of the mark space table contains a list of up to seven mark times. These mark times are designated MARK TIME #0 through MARK TIME #6 in the diagram. Each mark time value is a sixteen bit value, for which each count increment represents a fixed amount of time. The count increment for a mark time is two microseconds. Thus, the longest mark time represented by a mark time value is $2^{16} \times 2$ microseconds. Not all of the mark time locations in the table must be filled. If there is only one mark time, then this value is placed in the MARK TIME #0 location. If there are two mark times, then the two values are placed in the MARK TIME #0 and MARK TIME #1 locations, and so forth.

The last entry in the upper row of mark/space table 20 contains sixteen bits of carrier modulation information. The first eight bits stores a modulation "on count" value M-ON, whereas the second eight bits stores a modulation "off count" value M-OFF. If the marks in the operational signal to be generated are modulated with a modulation signal (other than the IR carrier signal), then the M-ON value indicates the length of time (in 0.5 microsecond increments) that the modulation signal is a digital high during a first part of a period of the modulation signal, whereas the M-OFF value indicates the length of time (in 0.5 microsecond increments) that the modulation signal is a digital low during a second part of that one period of the modulation signal.

The bottom row of mark/space table 20 contains a list of up to eight space times. These space times are designated SPACE TIME #0 through SPACE TIME #7 in the diagram. Each space time value is a sixteen bit value. The count increment of a space time is two microseconds. Not all of the space time locations in the table must be filled. If there is only one space time, then this value is placed in the SPACE TIME #0 location. If there are two space times, then the two values are placed in the SPACE TIME #0 and SPACE TIME #1 locations, and so forth.

The string of timing information 21 is a sequence of eight bit values. Such a string can be long or short. In the illustrated example, each eight-bit value (a byte) is either a mark/space pair byte or a control byte.

Figure 3:
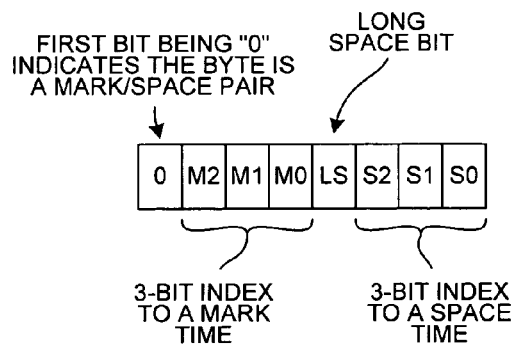
FIG. 3 illustrates the significance of each bit of a mark/space pair byte.

FIG. 3 illustrates the significance of each bit of a mark/space pair byte. The first bit is a designator bit. The designator bit of the byte being a zero indicates that the byte is a mark/space pair. Bits M2, M1 and M0 are a three-bit index that points to one of the mark times in mark/space table 20. Similarly, bits S2, S1 and S0 are a three-bit index that points to one of the space times in mark/space table 20. For example, if S2=0, S1=1 and S0=0, then the three-bit index points to SPACE TIME #2.

Figure 4:
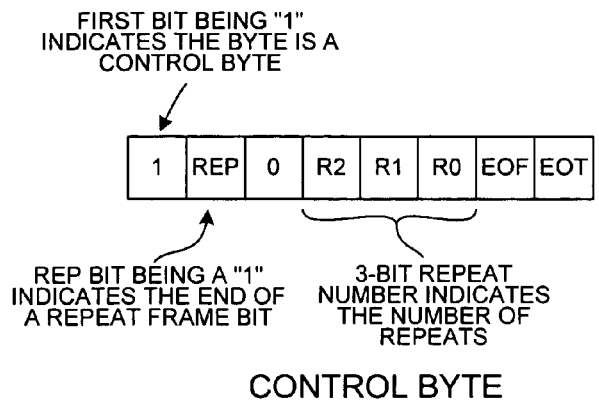
FIG. 4 illustrates the significance of each bit of a control byte.

FIG. 4 illustrates the significance of each bit of a control byte. The first designator bit of the byte being a "1" indicates that the byte is a control byte. If the REP bit is a "1", then the control byte marks the end of a repeat frame. The number of times the repeat frame is to be repeated is indicated by a three-bit repeat number composed of bits R2, R1 and R0. If the end-of-frame bit (EOF) is set, then the byte marks the end of a frame. If the end-of-transmission bit (EOT) is set, then the byte marks the end of the string of timing information.

Mark/space table 20 together with string of timing information 21 is a particularly compact way of storing the information used to generate operational signal 13. The number of bits used to describe each mark time and space time in string of timing information 21 can be reduced to a small number, in this case three bits, that distinguishes from among a limited number of entries in mark/space table 20. Each of those entries can in turn describe a mark time or a space time with the accuracy of more bits, in this case sixteen bits. If a mark time in a string of timing information were to be described with a large number of bits, the large number of bits would be used each time the particular mark occurs in the operational signal. The same applies for a space time described by a large number of bits. Where a mark or a space occurs many times in an operational signal, a first string of timing information that describes the operational signal without referring to a mark/space table will consist of more bits than the combined number of bits in a mark/space table and a second string of timing information that refers to the table.

IR Transmission Engine:

IR transmission engine 5 uses the information in mark/space table 20 and the string of timing information 21 to generate an operational signal as follows. The timing engine first reads the modulation information MOD INFO stored in the mark/space table 20. If the bits in the operational signal are to be modulated, then the M-ON and M-OFF values stored there are non-zero. The M-ON value indicates the length of time, in 0.5 microsecond increments, that the modulation signal is a digital high in a first part of a period of the modulation signal, whereas the M-OFF value indicates the length of time, in 0.5 microsecond increments, that the modulation signal is a digital low in a second part of the period of the modulation signal. If both M-ON and M-OFF are 00 h, then there is no modulation (i.e., the operational signal is a non-modulated baseband signal type). It is an illegal condition to have one of the M-ON and M-OFF values as 00 h, and the other as a non-zero value.

After retrieving the MOD INFO bits, the IR transmission engine 5 reads the first byte of the string of timing information. If the first byte is a mark/space pair byte, then the IR transmission engine 5 outputs a digital logic high signal for a length of time as indicated by the mark time pointed to by the mark portion of the mark/space pair. If the mark portion of the mark/space pair is the value "111", then the mark time pointed to is the mark time pointed to by the previous mark/space pair in the string of timing information.

After outputting the digital logic high signal, then IR transmission engine 5 outputs a digital logic low signal for a length of time as indicated by the space time pointed to by the space portion of the mark/space pair. In this way the IR transmission engine 5 goes through the bytes in the string of timing information 21 generating digital logic high and digital logic low times.

If IR transmission engine 5 reads a control byte in the string of timing information 21, then actions are taken as indicated by the bits in the control byte. If, for example, a control byte is read whose repeat bit REP is set, then the IR transmission engine 5 outputs high and low signals as dictated by the mark/space pair bytes in the prior repeat frame. The prior repeat frame is ended by the control byte. The prior repeat frame starts either at the beginning of the string of timing information, or at the immediately preceding control byte whose REP bit is set. (A repeat frame ends with a control byte whose REP bit is set, but if the REP bit is set then the EOF bit is not set. Even though the EOF bit is not set, the repeat control byte designates an end of frame.)

IR transmission engine 5 repeats the preceding repeat frame a number of times indicated by the three-bit repeat number R2, R1 and R0. A repeat number of 000 indicates an "infinite" repeat count. An infinite repeat means that the prior frame will repeat and continue to repeat until the key that initiated the transmission is detected to have been released (e.g., the key is no longer being pressed) as reported by key scanning functionality 4.

If the EOF bit is set, then the end of frame is indicated. This could be the end of a non-repeat frame at the start of a transmission, or could be used in conjunction with the EOT bit to designate the end of the transmission.

If the EOT bit is set, then an end of transmission is indicated. The EOT bit is only used to designate the end of the last frame.

IR transmission engine 5 continues reading mark/space pair bytes and control bytes in the string of timing information 21 until the EOT control byte is encountered, or until an infinite repeat count is terminated by an external source such as the release of a key. IR transmission engine 5 then stops outputting the operational signal.

Figure 5:
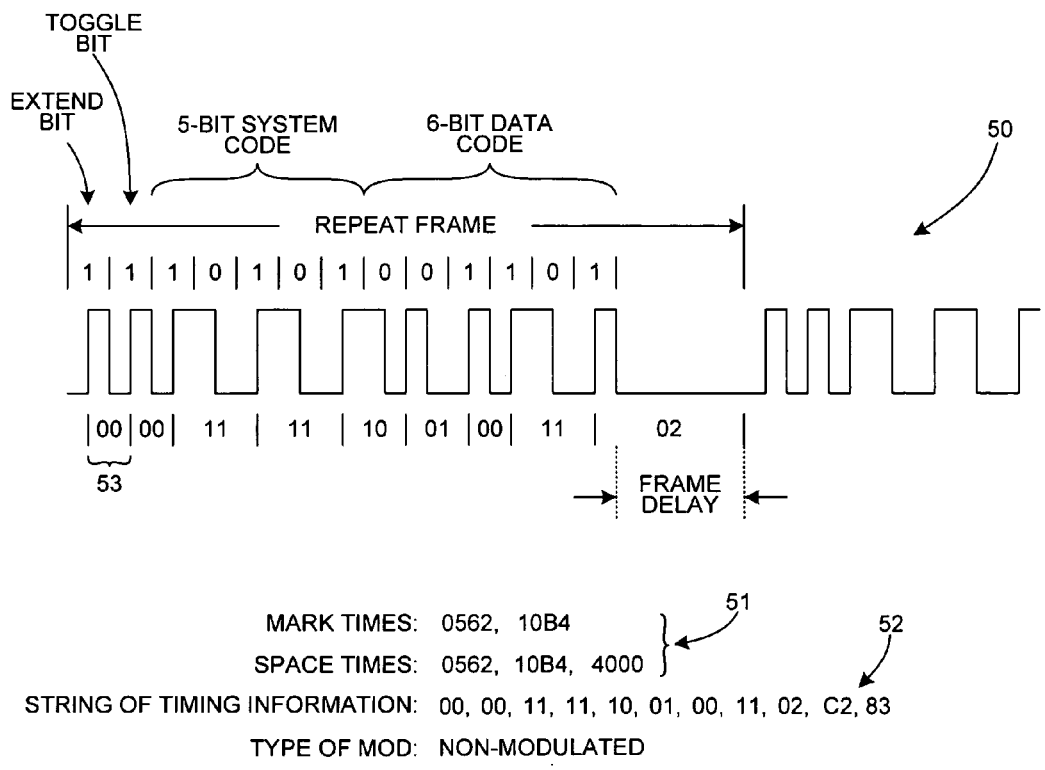
FIG. 5 illustrates an example of a waveform of an operational signal, as well as the mark/space table and the string of timing information used to generate that operational signal.

IR Operational Signal:

FIG. 5 illustrates an example of a waveform 50 of an operational signal, as well as a mark/space table 51 and a string of timing information 52 used to generate the operational signal. Each portion of waveform 50 where the signal value is a digital high is referred to as a mark. Each portion of the waveform 50 where the signal value is a digital low is referred to as a space. A value indicative of the time duration of each mark is placed in the mark/space table. In the example of FIG. 5, some marks are longer than other marks, and there are only two mark times. The mark/space table therefore contains two mark times: 0562 and 10B4. In the example of FIG. 5, there are spaces of three different time durations. Accordingly, three space times are placed in the mark/space table: 0562, 10B4, 4000.

IR transmission engine 5 receives a mark/space pair and outputs the mark first, and then a space as indicated by the following space time. Accordingly, the first mark/space pair corresponds to the initial mark and the following space designated by reference numeral 53 in FIG. 5. The mark to be output is found in MARK TIME #0. The following space time is found in SPACE TIME #0. Accordingly, the first mark/space pair in the string of timing information 52 is 00.

Similarly, the next mark and next space to be generated are identical to the initial mark and space. Accordingly, the second mark/space pair in the string of timing information 52 is also 00.

As can be seen from the waveform of FIG. 5, the next mark to be output is longer than the initial two marks. Its duration is identified by the MARK TIME #1. The next space to be output is also of this duration, and its duration is identified by the SPACE TIME #1. Accordingly, the third mark/space pair of the string of timing information 52 is 11.

The mark/space pairs in the string of timing information 52 continues in this way. The last mark/space pair is 02. SPACE TIME #2 corresponds to the relatively long space time labeled "frame delay" in FIG. 5. If this were the last space time of the operational signal to be generated, then the next byte in the string of timing information would be a control byte whose EOT bit is set to indicate the end of transmission.

The waveform of FIG. 5, however, is to repeat the frame labeled "repeat frame" in the waveform diagram. This repeating is to continue until the key that initiated the transmission is released. The repeat frame begins with the first 00 mark/space pair and ends with the 02 mark/space pair. A control byte of C2 is therefore placed after the 02 mark/space pair. In this control byte, the first bit is a one to designate the byte as a control byte. The second bit (the REP bit) is set to designate that the frame immediately preceding the control byte is to be repeated. The subsequent three repeat bits (the R2, R1 and R0 bits) are 000 to indicate that the prior frame is to be repeated an infinite number of times as long as the key remains pressed. The EOF bit is set to designate the end of the prior frame. The EOT bit is not set because the repeat frame must be completed for the required number of repeats before the end of the signal can be declared. The control byte is therefore C2.

When IR transmission engine 5 receives this control byte, it returns to the beginning of the prior frame in the string of timing information 52. The prior frame is either bounded by the immediately preceding control byte whose EOF is set, or if there is no such control byte then by the starting mark/space pair of the string of timing information. In the example of FIG. 5, the prior frame is bounded by the start of the string of timing information 52. IR transmission engine 5 therefore returns to the first mark/space pair of 00 and begins the process again. The IR transmission engine generates the marks and spaces of the IR operational signal 13 (see FIG. 1) in this fashion using the bytes in the string of timing information 52 as instructions until the key is released.

The last control byte is 83, indicating the end of frame as the end of transmission.

Downloading of a Codeset Script:

The interpreting of script 10 outputs marks and spaces and other information to level one builder 3. The level one builder 3 loads the values into a mark/space table 51 and in the string of timing information 52. After the mark/space table and the string of timing information are generated, a script instruction SEND is interpreted, which starts IR transmission engine 5 operating on the contents of the mark/space table and string of timing information. IR transmission engine 5 causes IR operational signal 50 of FIG. 5 to be output from IR transmitter 12 of remote control device 1.

FIGS. 6-10 set forth script 10. FIG. 12 is a diagram that shows the global registers 9. FIG. 13 is a diagram showing the opcodes of the instructions of the script language of script 10.

In the present example, remote control device 1 initially does not have the ability to output codes for a particular codeset, the "RC5 codeset", but it is desired that remote control device 1 have that functionality. Loader 7 and IR receiver functionality 6 are used to read in a portion of script via IR receiver 15. Once loaded into memory on remote control device 10, this loaded portion of script along with script previously loaded (which together constitute script 10) are interpreted such that when a user presses a key on remote control device 1, a key code of the RC5 codeset is output in the form of an IR operational signal out of IR transmitter 12.

When script interpretation starts, it automatically starts at the label RESET (600). The label RESET is the first line at the top of FIG. 6. A label, like this label RESET, represents a sixteen bit address. This label can be pointed to by a pointer elsewhere in the script. For example, when batteries are initially put into remote control device 1, script interpretation starts at label RESET.

Next (601), a call of the auxiliary 0 [AUX(0)] routine is made. AUX(0) causes key scanning functionality 4 to perform a key scan. The AUX(0) instruction is code that was originally written at the assembly code level. A starting address lookup table AUX_TABLE (see FIG. 7) stores the location in memory where the associated subroutine code for each AUX instruction is located. Calling an AUX instruction causes this AUX TABLE to be consulted, and the starting address for the auxiliary routine identified by the number in the parentheses to be called. Initially, at the time AUX(0) is called in the present example, there is only one AUX instruction provided in the AUX_TABLE. The AUX(2) starting address of line 729 is not yet loaded into the AUX_TABLE. The only starting address in the AUX TABLE is the starting address of AUX(0) of line 727.

Returning to line 601, AUX(0) is called. Calling AUX(0) causes key scanning functionality 4 to scan the keys on the key matrix of remote control device 1. After performing the key scan, key scanning functionality 4 writes a number into the ADR0 register that indicates the number of keys that are detected to be pressed. This value is a value from zero to three. Key scanning functionality 4 also writes key matrix coordinates for up to three keys into ADR1, ADR2, ADR3. Each coordinate includes a four-bit value that identifies the row in the matrix where the key is located, and a four-bit value that identifies the column in the matrix where the key is located.

In the present example, the user presses the LOAD key 17 (see FIG. 1) and without releasing the LOAD key then presses the "2" digit key so that both the LOAD key and the "2" key are simultaneously pressed. The user does this to initiate the loading of the RC5-generating script. The RC5-generating script is to be loaded into remote control device 1 and is then to be referred to as the AUX(2) instruction.

Accordingly, when the LOAD key is initially pressed, there is one key pressed. A "0001" is therefore written into ADR0. The four-bit row number (R) of the LOAD key is "7" and the four-bit column number (C) of the LOAD key is "1". The value "71" (RC) is therefore written into ADR1. The contents of ADR2 and ADR3 are "don't cares" because only one key is detected as having been pressed.

Next (602), a case instruction is used to test the contents of ADR0. As indicated by the byte <#03> following the CASE statement, there are three possibilities. If the value in ADR0 is "0000", then script interpretation returns (603) to the RESET label (600). The reset label is identified by the <#RESET_H> and <#RESET_L> bytes. This return occurs because no key was detected to have been pressed.

If the value in ADR0 is "0001", then script interpretation proceeds (604) to the SEND_CODE label (607). This occurs because one key was detected to have been pressed.

If the value in ADR0 is "10002", then script interpretation proceeds (605) to the SET_CDSET label (700). This occurs because two keys were pressed simultaneously. This situation would occur, for example, if the user of the remote control device were to simultaneously press the PROGRAM key 18 and another key. Holding the PROGRAM key 18 down while pressing a digit key causes the remote control device to start using a different codeset as determined by the digit key pressed.

If ADR0 is none of "0000", "0001", "0002", then the situation is treated as an error condition (606) and script interpretation returns to the RESET label (600).

In the present example, only the LOAD key is pressed at this time. Script interpretation therefore proceeds to the SEND_CODE label (607). The upper and lower nibble values in ADR1, which indicate the row and column key matrix coordinates of the key pressed, are compared (608) using the CP8(1) script instruction to the row and column key matrix values for the PROGRAM key. If there is a match, the FLAG bit is set, otherwise the FLAG bit is reset.

Next (609), according to the IFNF(1) instruction, if the FLAG is not set (i.e., the PROGRAM key was not pressed), then the number of instructions in the parentheses is jumped. If FLAG is set (i.e., the PROGRAM key was pressed), then the next line (610) will not be skipped, and script interpretation will jump due to the jump direct JP(D) instruction. The jump direct instruction causes script interpretation to jump to the location identified by the two bytes following the JP(D). In line 610, the following bytes are <#RESET_H> and <#RESET_L>. These two bytes are the address of the label RESET (600). Accordingly, if the PROGRAM key had been pressed, then processing returns to RESET where the key scan function will be repeated to determine the other key that is pressed after the PROGRAM key.

In the example being explained, the PROGRAM key was not pressed and the FLAG bit was not set. Script interpretation therefore skips line 610.

Next (611), the contents of ADR1 is compared with the row and column coordinates for the LOAD key 17. The row and column coordinates are found in the key table in line 639. In the present example, the LOAD key was pressed. The FLAG is therefore set.

Next (612) the if-not-flag script instruction IFNF causes the next line (613) to be jumped if FLAG is not set. Because FLAG is set, however, processing proceeds to line 613. Processing jumps due to the jump instruction (613) to the LOAD_CODE label (1100). The LOAD_CODE subroutine is shown in FIG. 11.

Next (1101), AUX(0) causes another key scanning operation to occur.

Next (1102), the value in ADR0 is compared with zero to check whether no keys are pressed. This compare is done to make sure that the LOAD key was not released without the pressing of another key. If the LOAD key is released without the pressing of another key, then an error condition has occurred and processing should return to RESET. Accordingly, if the FLAG bit is not set (1103), then the next instruction which is a jump back to RESET is jumped. Otherwise, the jump instruction of line 1104 is jumped.

Next (1105), the value in ADR0 is compared with the number two to check whether two keys have been simultaneously pressed. If two keys were not pressed, then the FLAG bit is not set and the instruction of line 1107 is interpreted. The instruction is a jump instruction back to the LOAD_CODE label which causes the loop to repeat. If, on the other hand, two keys are detected to have been pressed, then the FLAG bit is set and line 1107 is jumped.

Next (1108), the contents of ADR1 is compared with the key coordinates of the LOAD key. If the compare is true, then one of the keys pressed is the LOAD key and the jump back (1110) to RESET instruction of the next line is jumped. Otherwise, an error condition has occurred and line 1110 causes a jump back to the RESET label.

Next (1111), the key coordinates for the second key pressed (in this example, the "2" digit key) is moved from ADR2 to ADR0. The key coordinates for the second key is then looked up in a KEY_TABLE. The KEY_TABLE is shown in lines 627-640 of FIG. 6. The LOOK8 instruction finds the key coordinates for the second key (the "2" key) in the left column at line 630. The row and column coordinates for the "2" key are "5" and "2". The row-column value <#52> is found in the left column of the table in line 630. The LOOK8 instruction therefore returns the <#02> in the second column of line 630, and this value put into ADR1. This "02" from the right column of the table is the offset where the key data for the "02" is found after the beginning of the block of key data for all the keys.

Next (1113), the offset of the POWER key is subtracted from the returned offset value. If the result is less than zero, then the offset value is the offset value for a digit key. This is because the offset value for the POWER key is one greater than all the offset values for the digit keys (see the KEY_TABLE). If the value returned from the LESS8 instruction of line 1113 is not less than zero, then second key pressed was not a digit key. Pressing LOAD and a key other than a digit key is an error condition. Line 1115 therefore causes processing to return to RESET. In the present example, however, the first key pressed is the LOAD key and the second key pressed is the "2" key. Line 1115 is therefore jumped.

Next (1116), the offset value of "6" is moved into ADR0 by the SWP(0,1) instruction. The offset value of "6" is then pushed (1116) onto the stack to save it.

Next (1118), the load script auxiliary instruction LDSAUX is called. LDSAUX causes IR receiver functionality 6 and loader 7 to receive the RC5 codeset script from an external device. The RC5 codeset script is received into IR receiver 15 of the remote control device 1. Loader 7 keeps track of the free memory available on remote control device 1 and maintains the AUX_TABLE (see FIG. 7) that contains the starting addresses of each AUX instruction. Interpreting of the LDSAUX instruction causes loader 7 to load the RC5 codeset script into memory and then to store the starting address (where the RC5 codeset script was stored) into the next available entry in AUX_TABLE. In the present example, the RC5 codeset script is to be AUX(2), where there are two previous AUX instructions, AUX(0) and AUX(1), in AUX_TABLE. Accordingly, the starting address <#RC5_CDSET> of the RC5 codeset script is loaded into line 729 of the AUX_TABLE.

In the present example, a 16-bit NEC bidirectional protocol is used to receive the RC5 codeset script onto remote control device 1 from the external device (not shown). A transmission in accordance with the protocol involves sixteen bits of data, followed by sixteen bits of inverted data. To initiate communication, the following four byte initiation transmission <LEN><LDSAUX><#02><CRC> is sent out of IR transmitter 12. The first byte <LEN> indicates the number of bytes of payload in the initiation transmission. The last byte <CRC> is a CRC check number used to check the integrity of the payload. Loader 7 uses IR transmission engine 5 to make this transmission. The <LDSAUX> byte is a predetermined bit sequence that is known to the external device from which the RC5 codeset script is to be downloaded.

The initiation transmission alerts the external device that remote control device 1 is ready to receive the AUX(2) script code. The external device responds by transmitting the RC5 codeset script back to remote control device 1 in the form of a series of packets. The packets are communicated in the form of IR signal 14 to IR receiver 15 in accordance with the NEC bidirectional protocol. Each packet is of the form <LEN><PKT><TPKT><D0><D1> . . . <CRC>. The first byte <LEN> indicates the number of bytes of payload in the current packet. The second byte <PKT> is a sequence number of the packet. The third byte <TPKT> is the total number of packets in the communication. The <DN> bytes are the payload of the packet. The last byte is a CRC check number used to check the integrity of the payload.

Once the first packet of the packet sequence is successfully received onto remote control device 1, then remote control device 1 signals successful receipt by sending the external device back a confirmation communication of the form <LEN><OK><PKT><CRC>. The byte <LEN> is the length of the payload of the confirmation communication. The byte <OK> is an indication of a successful communication. The byte <PKT> is the sequence number of the last packet that was successfully received.

If the first packet is not successfully received onto remote control device 1, then remote control device 1 sends the external device back an error communication of the form <LEN><ERROR><PKT><CRC>. The byte <LEN> is the length of the payload of the error communication. The byte <ERROR> is an indication of a successful communication. The byte <PKT> is the sequence number of the last packet that was successfully received. The external device can then resend the first packet until it is successfully received by remote control device 1.

When the first packet of the sequence is successfully received onto remote control device 1, then the second packet is sent from the external device to the remote control device. In this way, the script is sent from the external device to the remote control device in a multi-packet communication.

Loader 7 in concert with IR receiver functionality 6 receives all the packets, and places the composite payload into a block of free memory, and then loads the starting address of the block of memory into the AUX_TABLE as set forth above. Interpretation of script interpreter 11 is halted during operation of the LDSAUX instruction of line 1118.

Once the LDSAUX instruction (1118) completes, the stack is popped (1119) to retrieve the key offset of the second key pressed (in the present example, the "2" key) into ADR0. An index to the starting address of the RC5 codeset script just downloaded is to be placed at the end of the indexes of codesets already in the CODE_TABLE. CODE_TABLE is illustrated in FIG. 7. Note that there are codeset scripts already loaded. Each of these codeset scripts is represented by a line entry 715-720 in CODE_TABLE. The first byte of a line entry is a byte indicating the AUX number. The second and third bytes are a label that points to the start of the codeset script in memory. To place the newly downloaded codeset script at the end of the already loaded codeset scripts, the value four <#04> is added (1120) to the key offset of the digit key ("02" in this case) present in ADR0, and the result is placed by the ADD instruction into ADR0. ADR0 therefore contains the value six in this example. This is an index for the line 721 in CODE_TABLE for the entry after the last used entry.

Next (1121), the LOOK16 instruction is used to look up the entry in CODE_TABLE that has a "6" in its left most column. This entry is line 721. The LOOK16 returns the starting address represented by the second and third bytes of the entry. The result returned is the label <#CODESET6_H><#CODESET6_L>. This label <#CODESET6_H><#CODESET6_L> is returned into ADR1.

This label is placed by the swap SWP instruction (1122) into ADR3, and is then moved into the STORE0 storage location by the STORE(0) instruction (1123). Once the CODESET6 label for the newly added codeset is stored, processing returns by virtue of the jump direct instruction (1124) to the label RESET.

The downloaded RC5_CDSET generating script is now present in remote control device 1 and is ready for use as the AUX(2) instruction.

Selection of a Codeset Script:

The downloaded RC5_CDSET generating script can then be selected to be the codeset script used by pressing the PROGRAM key 18 and the "2" key. After processing returns to RESET, the AUX(0) instruction is performed (601) which causes a key scan to be performed. If the PROGRAM key 18 and the "2" key are both pressed, then the value "2" will be present in ADR0 to indicate two keys are pressed, the row and column coordinates for the PROGRAM key will be present in ADR1 and the row and column coordinates for the "2" key will be present in ADR2. Because ADR0 contains "2", the compare of line 605 is true and processing proceeds to the SET_CDSET label (700).

Next (701), the key coordinates in ADR1 are compared with the key coordinates of the PROGRAM_KEY and the FLAG bit is set if there is a match. If the key coordinates indeed indicate the PROGRAM key was pressed, then line 703 is jumped. If, on the other hand, neither of the keys was the PROGRAM_KEY, then the pressing of two keys was an illegal situation, the compare operation of line 701 does not set FLAG, and line 703 is interpreted causing a return to the label RESET.

If the PROGRAM key was pressed, then the key coordinates for the second key are moved into ADR0 by operation of the swap instruction of line 704. The key coordinates of the second key pressed in ADR0 are then used to lookup the key offset in KEY_TABLE (see FIG. 6). In the present example, the key offset returned is the offset for the "2" key.

Next (706), a check is made to make sure that the key was a digit key. To do this, the key offset for the POWER_KEY is subtracted from the key offset looked up in the KEY_TABLE for the second key pressed. If the result is less than zero, then the second key pressed was a digit and FLAG is set. If FLAG is set, then line 708 is jumped and processing proceeds to line 709. If FLAG is not set, then line 708 is not jumped, an error condition is detected, and operation proceeds to RESET.

Next (709), the key coordinates for the second key pressed in ADR2 are used as an index into CODE_TABLE to lookup the starting address of the AUX(2) (RC5_CDSET) script. The starting address <#CODESET6_H><#CODESET6_L> is returned into ADR0.

Next (710), the starting address <#CODESET6_H><#CODESET6_L> in ADR0 is moved into ADR3. The STORE(0) instruction (711) is then used to move the starting address of the selected codeset into STORE0. Processing then returns (712) to RESET.

The downloaded RC5_CDSET generating script has now been selected to be the codeset script used.

Pressing a Key to Output an Operational Signal:

Once the RC5_CDSET script is loaded onto remote control device 1 and the starting address of the RC5_CDSET script is present in STORE0, the RC5_CDSET script can be used to generate operational signals. Consider the situation in which the "5" key is pressed.

Script operation continuously loops between the RESET label (600) and the return to RESET (606), each time performing the AUX0 instruction. When the "5" key is pressed, the number one is returned into ADR0 to indicate that only one key was pressed. The row and column key coordinates of the "5" key are returned into ADR1. Accordingly, the CASE instruction of line 602 results in a match at line 604 and processing proceeds to the SEND_CODE label (607).

The key coordinates in ADR1 are compared (608) with the coordinates of the PROGRAM key 18. Because the key pressed was not the PROGRAM key, line 610 is jumped. The key coordinates in ADR1 are then compared (611) with the coordinates of the LOAD key 17. Because the key pressed was not the LOAD key, line 613 is jumped. If the key pressed had been either the PROGRAM key or the LOAD key, processing would have jumped back to RESET.

Next (614) the swap instruction SWP(0,1) causes the value in ADR0 to be swapped with the value in ADR1. This moves the key scan coordinates into ADR0. The key scan coordinates for the "5" digit key are "53".

Next (615), the LOOK(8) instruction causes the value in ADR0 to be used as an index to look up the key offset for the "5" key in KEY_TABLE. If the value in ADR0 is found in the left column of the table, then the LOOK instruction returns the value in the same row but in the right column. The value is returned into ADR1. In the present example, the value "53" in ADR0 is found in line 633 of KEY_TABLE, and the LOOK instruction returns into ADR1 the offset value "05" from the right column of line 633. This "05" value is the key offset value for the key identified by the KEY_TABLE row-column coordinates <#53> found in the left column at line 633.

Next (616), the set key instruction SETK(1) loads the value in ARD1 into the key register KEY. Accordingly, the key offset of "05" is placed into global register KEY.

Next (617), the RTRV(0) instruction retrieves the value in STORE0 and places it into ADR3. Recall that the starting address of the RC5_CDSET script was placed into STORE0 at line 712 in the set codeset SET_CDSET subroutine. The starting address of the RC5_CDSET is therefore present in ADR3.

Now that the key offset value "05" is present in KEY, and now that the starting address of the RC5_CSET script is in ADR3, the CLRU(3) instruction is called (618) to execute the RC5_CDSET script. The RC5 codeset script then builds a level one script.

Operation of the RC5 Codeset Script:

The RC5_CDSET script that was downloaded into remote control device 1 is set forth in FIGS. 8-10. Operation of the RC5_CDSET script is as follows.

First (801), a pointer to the system bits is loaded into ADR1. The two bytes <#RC5_SYS_H> and <#RC5_SYS_L> following the LD(1) byte together form a sixteen-bit pointer to the RC5_SYS label where the system code is found. The <D4h> byte identified by line 806 contains the extend bit (a "11" in this example), six system code bits ("10101" in this example), and two trailing zeros.

Next (802), a pointer to the byte where the six-bit key code starts is loaded into ADR2. The six-bit key code is being loaded into ADR2 for future use. The pointer is determined as follows. The two bytes following the LDK(2) instruction together form a sixteen-bit pointer <#RC5_DAT_H> and <#RC5_DAT_L>. This pointer points to the byte where the various key code data values for each of the various keys of the remote control are stored. Following these #RC5_DAT pointer bytes is another byte <#06> which contains the number N of bits in each key data code value. In the present example there are six bits in each key data code value, so N is the value "06h". Interpretation of the LDK(2) instruction multiplies six by the key offset value KEY. The result is a number of bits. This number of bits is divided by the number of bits in a byte to obtain a byte offset number. The 8-bit byte offset number is placed into OBYT. The remainder of the division is an 8-bit number of bits that marks the beginning of the key code data within the byte identified by the sum of <#RC5_DAT_H>, <#RC5_DAT_L> and OBYT. This 8-bit remainder is placed into OBIT. The sum of <#RC5_DAT_H>, <#RC5_DAT_L> and OBYT is placed into the virtual address identified by the number in the parenthesis. Accordingly, the values <#RC5_DAT_H>, <#RC5_DAT_L>, OBYT and OBIT together point to the first bit of the six-bit key code data value for the particular key pressed.

Next (803), the RC5 function (see FIG. 10) is called by the CALDU instruction. CALDU is a call direct uncounted function call to the function identified by the label in the following bytes. In the present example, the following bytes are <#RC5_H> and <#RC5_L> so interpretation of script 11 proceeds to line 1000 of FIG. 10.

Next (1001), the SETMOD instruction causes the M-ON and M-OFF values to be loaded into the appropriate places in the mark/space table of FIG. 2.

Next (1002), a half-bit time is loaded into ADR0. The RC5 codeset is a Manchester encoded codeset. The half bit time that a Manchester encoded bit is high is loaded from <#HALF_BIT_TIME_H> into the upper eight bits of ADR0 and the half bit time that a Manchester encoded bit is low is loaded from <#HALF_BIT_TIME_L> into the lower eight bits of ADR0. The half bit times are in increments of two micro seconds.

Next (1003), a pointer to the Manchester function is loaded into ADR3. The Manchester function is set forth in FIG. 9.

Next (1004), the CLRC(3) (4) instruction is interpreted. CLRC(3)(4) is a "call relative counted" (CLRC) function call to the function identified by the label in ADR3, and script interpretation returns after interpretation of the number of instructions in the following parentheses (four, in this example). Because the label of the Manchester function was previously loaded into ADR3, the CLRC(3)(4) instruction jumps to the Manchester function of FIG. 9. The Manchester function is a block of script that writes the mark times and space times corresponding to digital ones and digital zeros into locations in register ADR0. Four instructions of this Manchester function are then interpreted.

Next (901), LDBITI(1) causes the first bit of the system code to be loaded into BIT. The LDBITI instruction is an increment load instruction in that after the FLAG bit is loaded, the values OBYT and OBIT are incremented so that the next time the LDBIT instruction is interpreted it will load the next bit into the FLAG bit. LDBITI is therefore a mechanism for loading the FLAG bit with consecutive bits.

In the case of line 901, ADR1 was loaded in line 801 with a pointer to the start of the five-bit system code bits. The six system code bits of the system code byte include an extend bit (a "1" in this example), and five system code bits ("10101" in this example). The last two bits of the system code byte are zeros. The system code byte is therefore D4h as indicated by line 806. Accordingly, the first bit (the extend bit) that is loaded into the FLAG bit by line 901 is a one.

Next (903), the second instruction of the Manchester function is interpreted. If the value of the FLAG bit is true (i.e., one), then jump the number of instructions identified in the parenthesis, otherwise proceed to the next instruction. In Manchester encoding, a one is encoded as a low-to-high transition in the middle of a bit time. A zero is encoded as a high-to-low transition in the middle of a bit time. If lines 904 and 905 are interpreted in order, then a write mark is output by interpretation of line 904 before a write space is output by interpretation of line 905. This results in the outputting of a Manchester encoded zero. If, on the other hand, lines 907 and 908 are interpreted in order, then a write space is output by interpretation of line 907 before a write mark is output by interpretation of line 908. This results in the outputting of a Manchester encoded one.

In this example, the flag bit FLAG is a one (due to line 901 and the extend bit being a one). The next two instructions (instructions 904 and 905) are therefore jumped, and the next instruction to be executed is line 907.

Next (907), the write space instruction WRS(0) of line 907 is interpreted. This causes a space of time indicated by the number in ADR0 to be output by script 10.

Next (908), the write mark instruction WRM(0) of line 908 is interpreted. This causes a mark of time indicated by the number in ADR0 to be output by script 10. The value in ADR0 is the half-bit time as indicated by line 1002. It is therefore seen that lines 907 and 908 result in the output of a Manchester encoded one bit. The instruction of line 908 is the fourth instruction interpreted after the function call of line 1004. Script interpretation therefore returns to line 1005.

In some protocols, a toggle bit is included. The value of the toggle bit is toggled from key code transmission to key code transmission. The toggle bit does not change from repeat frame to repeat frame during the time a single key is held down, but rather toggles upon each successive pressing of the key. To support protocols using a toggle bit, a virtual toggle counter is supported. Each time a key is pressed, the eight-bit toggle counter value TOGGLE increments. The RC5 protocol is a protocol that uses a toggle bit.

Next (1005), the IFNMT(1) instruction applies the mask in the first following byte <01h> to the toggle count TOGGLE. If the result is true, then the number of lines indicated in the parentheses is jumped. Because the toggle register TOGGLE increments upon the pressing of a key, applying the <01h> mask to TOGGLE results in an alternating one-instruction jump or not, from key press to key press.

In the first interpretation of IFNMT, the toggle counter value is 00h. The masking therefore does not result in a jumping of instructions.

Next (1006), the SFLG instruction causes the flag bit FLAG to be set.

Next (1007), the reset flag instruction (1008) is jumped so that the next instruction to be interpreted will be the function call of line 1009.

Next (1009), a function call "direct counted" is made to write the toggle bit. This is done by calling the MANCH_TOG function, executing three instructions, and then returning. Because the FLAG bit is set due to interpretation of line 1006, the lines 907 and 908 are interpreted, thereby resulting in the outputting of a Manchester-encoded one.

When the WRS instruction and WRM instructions are interpreted, a sequence of mark time values and space time values is generated. It may be the case, for example, that consecutive mark time values are generated. It may also be the case that consecutive space time values are generated. If two consecutive mark time values are output, the operational signal to be generated will have a mark time equal to the sum of the two consecutive mark time values because the operational signal will remain at the digital high value throughout the entire time period of the two mark times. The appropriate value to write into the mark table is therefore a single mark time whose time duration is the sum of the two consecutive mark time values. The level one builder 3 therefore only writes to the mark/space table and the string of timing information when interpretation of script 8 results in a change in the operational signal. If, for example, two consecutive mark time values were output, followed by a space time value. In this case, the two consecutive mark time values would be added together by level one builder 3 to obtain a sum. The mark/space table would then be examined to see if this sum is present. If it is, then the sum need not be added to the mark/space table again. Rather, the mark nibble to the next mark/space pair is written to be a pointer that points to the sum value in the mark/space table. If, on the other hand, the sum value is not in the mark/space table, then the level one builder 3 writes the sum value into the mark/space table. The mark nibble to the next mark/space pair is written to be a pointer to the newly added mark time. When a mark time nibble and a space time nibble are generated in this fashion, the pair of values is written into the string of timing information to be a mark/space pair value.

In the interpretation of script 10, interpretation returns to line 1010. The loop instruction LOOP(5) causes interpretation to proceed to the next endloop instruction <ENDLP>, and then to loop back to the loop instruction the number of times indicated in the parentheses. Accordingly, the function call CLRC(3)(4) is called five times, once for each of the five system bits following the extend bit. As explained above, the (3) means that the call is to the label stored in ADR3. The value <#MANCH_H> and <#MANCH_L> was stored into ADR3 in line 1003. Accordingly, each interpretation of line 1011 causes a function call to line 900 (see FIG. 9). On each such call, the LDBITI instruction of line 901 loads the next bit of the system code into the flag bit FLAG. The following MANCH_TOG portion of script then outputs either a mark and then a space or a space and then a mark, depending on the value of the bit of system code.

Next (1013), the swap instruction SWP(1,2) is interpreted. The contents of the registers ADR1 and ADR2 are swapped. Because ADR2 contains a value that points to the beginning of the key code data due to the prior interpretation of line 802, a value that points to the start of the key code data is loaded into ADR1. By changing the value in ADR1 from a pointer that points to the beginning of the system code data to a pointer that points to the beginning of the key code data, subsequent interpretation of the function MANCH will result in generating mark times and space times for the key code data bits.

Next (1014), the LOOP(6) instruction is executed to call the CLRC(3)(4) six times, thereby resulting in the output of mark and space times for the six key code data bits "001101".

Next (1017), the write space time direct instruction WRS (D) is interpreted to output an inter-frame space delay. The inter-frame space time delay value is found in the next two bytes <#FRAME_SPACE_H><#FRAME_SPACE_L>. As explained above, if the preceding value output by interpretation of the script had been a space time value, then there would have been two consecutive space time values. The two space time values would have been summed, and the resulting value would have been loaded into the space table if it was not already present in the space table. A pointer to the resulting space time value would then have been added to the string of timing information.

In the example of the waveform of FIG. 5, this is not the case. The Manchester bit preceding the frame delay space time was a Manchester-encoded one. A Manchester one is a space time, followed by a mark time.

As is evident from the waveform of FIG. 5, the entire frame consisting of the extend bit, the toggle bit, the five system code bits, the six key code data bits, and the frame delay space time is to be repeated. The next instruction (1018), is therefore the end of frame EORF(0) instruction. Interpretation of the end of repeat frame instruction EORF does not cause the script of FIG. 10 to loop, but rather causes the frame to be repeated in the string of timing information being built. The number in parentheses indicates the number of times to repeat. If the number is zero, then the prior frame is to be repeated infinitely until the key is released. In the example of the RC5 routine, the looping is an infinite looping. The script interpreter 11 therefore outputs a control byte "C2" whose repeat bit REP is set, and whose repeat number R2, R1, R0 is 000 to indicate an infinite repeat. The EOF bit is set, but the end of transmission bit EOT is not set. The control byte output is therefore "C2" and this control byte is added to the string of timing information of FIG. 5.

Next (1019), the EOT instruction causes an end of transmission control byte "83" to be output.

Next (1020), the return instruction RET causes interpretation of the script to return to the portion of script that called the RC5 function. Script interpretation therefore returns to line 804 (see FIG. 8). Line 804 is the return RET instruction. Script interpretation therefore proceeds to the section of script that called the RC5_CDSET function. Script interpretation therefore returns to the instruction following the CLRU(3) instruction of line 618 (see FIG. 6). This instruction is the SEND instruction which starts the IR transmission engine 5 operating on the mark/space table and the string of timing information that were just built. The result is the transmission of the RC5 IR operational signal for the "5" key as illustrated in the waveform of FIG. 5.

Generation and Sending of the Operational Signal:

Interpretation of SEND (line 619 of FIG. 6) causes the IR transmission engine 5 to start working on the mark/space table and string of timing information, thereby causing the IR transmission engine 5 to begin generating the IR operational signal 11. IR transmission engine 5 goes through the string of timing information, outputting the IR operational signal of the waveform of FIG. 5 up until the frame delay portion. In this example, IR transmission engine 5 is a subroutine executed by the microcontroller of remote control device 1.

When the time of outputting the frame delay (see the waveform of FIG. 5) starts, a hardware timer is started to interrupt the microcontroller when the frame delay has expired. The microcontroller then executes other code until interrupted.

In the present example, the frame of the waveform of FIG. 5 is to be repeated indefinitely until the key that causes the output of the IR transmission (in this example, the "5" key) is released. To detect the release of the key, processing continues to WAIT_KEY (620).

Next (621), AUX0 is called, thereby causing a key scan to be performed. If the number of keys detected is one, then the compare of line 623 will not be true. The jump back (624) to the WAIT_KEY will occur, and the process will repeat as long as the same key is detected as being pressed.

If the currently pressed key is released, however, then the number in ADR0 will be zero. The compare of line 623 will be true, the jump of line 624 will be jumped, and the STOP instruction (625) will be interpreted. The STOP instruction causes IR transmission engine 5 to stop outputting the operational signal. The following jump instruction (626) returns script interpretation to the RESET label.

Figure 14:
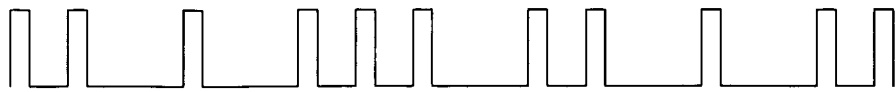
FIGS. 14-16 illustrate waveforms of operational signals, as well as the mark/space tables and the corresponding string of timing information used to generate those operational signals.
Figure 15:
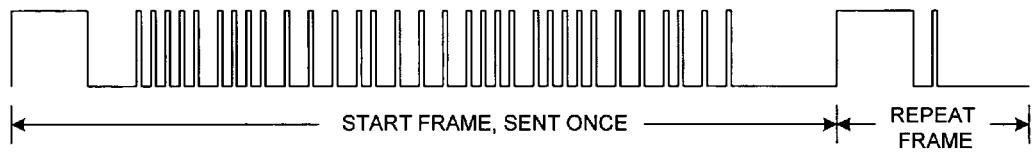
Figure 16:
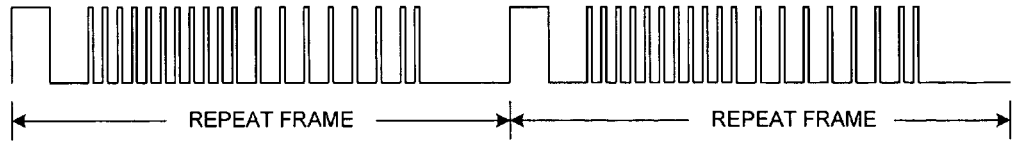

Other Examples:

FIGS. 14-16 illustrate three examples of the mark/space tables and strings of timing information used to generate operational signals.

DESCRIPTION OF SCRIPT INSTRUCTIONS

<WMS(N)><BYTE1><BYTE2><BYTEN> . . . Writes a series of mark/space pairs into the mark/space table. The number of mark/space pairs is denoted by N. The value N is a value from one to sixteen. The mark/space pairs are present in the bytes following the <WMS(N)>.

<SETMOD><#M-ON><#M-OFF> Writes the modulation values M-ON and M-OFF into the appropriate place in the mark/space table.

<EOF> Outputs an end of frame control byte to the level one builder.

<EOT> Outputs an end of transmission control byte to the level one builder.

<STOP> Stops the IR transmission at the soonest point that maintains the integrity of the signal along with any end of frame byte.

<SEND(U)> Starts transmitting the IR operational signal according to the level one script loaded into the string of timing information. The IR operational signal is transmitted for an unlimited number of repeats.

<SEND(L)> Starts transmitting the IR operational signal according to the level one script loaded into the string of timing information. The IR operational signal is transmitted for a limited number of repeats, where L is the number of times to send the signal.

<ABORT> Aborts transmission of the IR operational signal at the soonest possible chance regardless of signal integrity.

<IFSEND> Does the same as the <SEND> instruction if the flag is set.

<EORF(ADDR)> Outputs an end of repeat frame control byte into the string of timing information. The number of repeats is N. If N is zero, then infinite repeat.

<WRM(ADDR)> A mark time found in the register denoted by ADDR is output to the level one builder for placement into the mark/space table.

<WRS(ADDR)> A space time found in the register denoted by ADDR is output to the level one builder for placement into the mark/space table.

<POP(ADDR)> Pops the contents of the stack into the register denoted by ADDR and the corresponding OFF register.

<INCTOG> Increments the TOGGLE register.

<WRM(D)><BYTE1><BYTE2> Outputs a mark time into the string of timing information. The sixteen bit time is given by the following two bytes BYTE1 and BYTE2.

<WRS(D)><BYTE1><BYTE2> Outputs a space time into the string of timing information. The sixteen bit time is given by the following two bytes BYTE1 and BYTE2.

<LD(ADDR)><BYTE1><BYTE2> Loads the register denoted by ADDR with the sixteen bit value given by the following two bytes BYTE1 and BYTE2. Clear the corresponding OFF register.

<LDO(ADDR)><BYTE1><BYTE2> Loads the register denoted by ADDR with the sixteen-bit value given by the following two bytes BYTE1 and BYTE2.

<PLD(ADDR)> Pushes the contents of the register denoted by ADDR onto the stack along with 00h for OFF, and carry out a LD instruction.

<PLDO(ADDR)> Pushes the contents of the register denoted by ADDR onto the stack along with 00h for OFF, and carry out a LDO instruction.

<CLRU(ADDR)> "Call Relative Uncounted" instruction. Calls a script function relative uncounted. The address of the script function is found in the register denoted by ADDR. Return on the RET instruction.

<CLRC(ADDR) (M)> "Call relative counted" instruction. Calls a script function relative counted. The address of the script function is found in the register denoted by ADDR. Returns after M instructions.

<CLDC(ADDR)><BYTE1><BYTE2> "Call relative direct" instruction. Calls a script starting at the address given in argument <BYTE1><BYTE2>. Return on RET instruction.

<LDBT(ADDR)> Sets the FLAG bit if the ADDR and OFF point to a bit which is zero. Otherwise, clears the FLAG bit.

<LDBITI(ADDR)> Sets the FLAG bit if the ADDR and OFF point to a bit that is zero. Otherwise, clears the FLAG bit. Then increments the bit pointed to by ADDR and OFF.

<PSHB> Pushes the FLAG bit onto the bit stack.

<POPB> Pops the bit stack into the FLAG bit.

<SFLG> Sets the FLAG bit.

<RFLG> Clears the FLAG bit.

<CLDU><BYTE1><BYTE2> "Call direct uncounted" instruction. Calls the script contained at the address denoted by <BYTE1><BYTE2>. Returns on the RET instruction.

<ADD(ADDR)><BYTE1><BYTE2> Adds the sixteen-bit argument <BYTE1><BYTE2> to the contents of the register denoted by ADDR, and puts the result into the register ADDR.

<SUB(ADDR)> Subtracts the sixteen-bit argument <BYTE1><BYTE2> from the contents of the register denoted by ADDR, and puts the result into the register ADDR.

<LDK(ADDR)><BYTE1><BYTE2><BYTE3> Loads the register denoted by ADDR with the first sixteen bits of the argument <BYTE1><BYTE2>. Loads the corresponding OFF register by the last eight bits <BYTE3> of the argument multiplied by the value in the KEY register.

<SWP(ADDR1, ADDR2)> Swaps the contents of the register denoted by ADDR1 and its corresponding OFF register with the contents of the register denoted by ADDR2 and its corresponding OFF register.

<RET> Returns from a CLDU or CLRU instruction.

<LOOP(N)> Loops through the instructions following the LOOP instruction until the ENDLP instruction is reached. The number of times to loop is indicated by N.

<ENDLP> This instruction marks the end of the LOOP instruction.

<LOOP(ADDR)> Loops through the instructions following the LOOP instruction until the ENDLP instruction is reached. The number of times to loop is found in the register denoted by ADDR.

<IFF(N)> If the FLAG bit is set, skips the next N instructions. If the FLAG bit is cleared, proceeds as normal.

<IFF(ADDR)> If the FLAG bit is set, skips the number of instructions indicated by the number in the register ADDR. If the FLAG bit is cleared, proceeds as normal.

<LESS8(ADDR)><BYTE1> Compares the argument <BYTE1> with the lower eight bits of the value in the register ADDR. If the argument <BYTE1> is less than the lower eight bits of the value in the register ADDR, sets the FLAG bit; otherwise clears the FLAG bit.

<LESS16(ADDR)><BYTE1><BYTE2> Compares the argument <BYTE1><BYTE2> with the sixteen bit value in the register ADDR. If the argument <BYTE1><BYTE2> is less than the sixteen bit value in the register ADDR, sets the FLAG bit; otherwise clears the FLAG bit.

<CP8(ADDR)><BYTE1> Compares the eight bit argument <BYTE1> with the lower byte of the register denoted by ADDR. If the two are equal, sets the FLAG bit; otherwise clears the FLAG bit.

<CP16(ADDR)><BYTE1><BYTE2> Compares the sixteen-bit argument <BYTE1><BYTE2> with the sixteen-bit value in the register ADDR. If the two are equal, sets the FLAG bit; otherwise clears the FLAG bit.

<MSK(ADDR)><BYTE1><BYTE2> If the logical AND of the register denoted by ADDR with the argument <BYTE1><BYTE2> is zero, clears the FLAG bit; otherwise sets the FLAG bit.

<CFLG> Complements the FLAG bit.

<SETK(ADDR)> Sets the KEY register with the contents of the lower byte of the register denoted by ADDR.

<LOOK8><BYTE1><BYTE2> Checks a table of entries, where each entry has a first eight-bit value and a second eight bit value. The table starts at the argument <BYTE1><BYTE2>. If the first entry in an entry matches the lower byte of the contents of ADR0, then the second value in the entry is returned ADR1.

<LOOK16><BYTE1><BYTE2> Checks a table of entries, where each entry has a first eight-bit value and a second sixteen-bit value. The table starts at the argument <BYTE1><BYTE2>. If the first entry in an entry matches the lower byte of the contents of ADR0, then the second sixteen-bit value in the entry is returned ADR1.

<CASE8><BYTE> Checks the subsequent table for equality with the lower byte of ADR0. Each table entry includes a one-byte case condition, followed by a two-byte jump address. The value in the lower byte of ADR0 is compared with each of the case conditions of the table.

When a match is found, the PC jumps to the address given by the two-byte jump address of the entry. The number of entries in the table is given by <BYTE>.

<CASE16><BYTE> Checks the subsequent table for equality with the sixteen-bit value in ADR0. Each table entry includes a two-byte case condition, followed by a two-byte jump address. The sixteen-bit value in ADR0 is compared with each of the case conditions of the table.

When a match is found, the PC jumps to the address given by the two-byte jump address of the entry. The number of entries in the table is given by <BYTE>.

<JP(N)> If N is positive, skips the number of instructions indicated by N. If N is negative, goes back the number of instructions indicated by N.

<JP(D)><BYTE1><BYTE2> This instruction causes a jump direct to the address indicated by the two-byte argument <BYTE1><BYTE2>.

<STOR(N)> Stores the sixteen-bit value found in ADR3 into the Nth general storage area. There are eight general storage locations. N can therefore range from zero to seven.

<RTRV(N)> Retrieves the contents of the Nth storage location, and places the retrieved contents into ADR3. There are eight general storage locations. N can therefore range from zero to seven.

<AUX(N)> Calls the auxiliary API that is identified by the auxiliary API number N.

<LDSAUX(N)><BYTE1> Loads the auxiliary script API using the code transfer protocol on the channel dictated by the argument <BYTE1>. The auxiliary script API becomes the Nth auxiliary API.

<LDAUX(ADDR)><BYTE1> Loads the auxiliary API using the code transfer protocol on the channel dictated by the argument <BYTE1>. The auxiliary API becomes the Nth auxiliary API. In contrast to the LDSAUX load script instruction which loads a script API, the LDAUX instruction loads an API of machine executable code that can be executed by the processor of the virtual machine.

<RESART> Jumps to RESET, initiates the values in all registers and storage locations, and restarts the script interpreter 11.

<DIRECT> Puts the script interpreter 11 into a protected mode called the "DIRECT mode." Interpretation of the current script is halted, and a two-way authentication handshake with an external device is made over the IR link to verify that the external device is authorized to use the DIRECT mode. When the DIRECT instruction is executed, an encrypted sixteen-bit number is sent back to the external device along with a three-byte pseudorandom number. In order to be authenticated, the external device uses the three-byte pseudorandom number and an encryption key to decrypt the sixteen-bit number. The external device sends the decrypted number back to the remote control device. If the remote control device detects that the decrypted number received back is correct, then the external device is authenticated and is allowed to use the DIRECT mode. An authenticated external device can then send a script instruction to the remote control device via the IR link. The script instruction is then immediately interpreted by the remote control device. After each injected script instruction is executed, the remote control device returns a response to signal that the instruction was executed on the remote control device. In this way, the external device can seize control of the remote control device and cause it to execute injected script instructions. Once in the DIRECT mode with an authenticated external device, the remote control device continues operating in the DIRECT mode until the external device sends the remote control device the RESTART instruction. Although the DIRECT instruction is described here in connection with the virtual machine receiving the injected instruction from a bidirectional IR link, the injected instruction can in other embodiments be received via another type of bidirectional link usable by the virtual machine.

<MEMRAM><BYTE1><BYTE2><BYTE3> Outputs from the IR transmitter 12 a stream of bytes, where the stream is the contents of a contiguous block of RAM <BYTE3> bytes long and starting at memory address <BYTE1><BYTE2>. This instruction can only be used in the DIRECT mode.

<MEMPRG><BYTE1><BYTE2><BYTE3> Outputs from the IR transmitter 12 a stream of bytes, where the stream is the contents of a contiguous block of program memory <BYTE3> bytes long and starting at memory address <BYTE1><BYTE2>. This instruction can only be used in the DIRECT mode.

<TRST> Restarts the script (trace restart) as with the RESET instruction, but puts the script interpreter 11 into a TRACE mode where, after each script instruction is interpreted, the script instruction and script registers are output from the IR transmitter 15. The order of information output is as follows: <INST><ARGS><ADR0><OFF0><ADR1><OFF1><ADR2><OFF2><ADR3><OFF3><KEY><TOGGLE><FLAG><STOR0><STOR1><STOR2><STOR3><STOR4><STOR5><STOR6><STOR7>. The external device must send a <STEP> instruction to instruct the script interpreter to execute the next instruction. In the meantime, the external device may send other instructions to the remote control device such as MEMRAM, MEMPRG, ID, DUMP, RUN, SBRK or RBRK. This functionality adds the ability for an on-chip debugger. This instruction can only be used in the DIRECT mode.

<ID> Outputs via the IR transmitter 15 a two-byte build ID for the product firmware which is set when the firmware is built. Following the two-byte build ID is a two-byte checksum of the current contents of the firmware. This instruction can only be used in the DIRECT mode.

<DUMP> The entire contents of firmware is output via the IR transmitter 15 in the form of 256-byte packets according to the communication protocol used to load scripts over the IR link. This instruction can only be used in the DIRECT mode.

<SBRK> This instruction may be sent while stepping through the script code in trace mode. This instruction will set a break point at the location where the script program pointer is currently located. Depending on the platform, the number of breakpoints will be limited to a certain number. The communication interface within the virtual machine will return with a one-byte ID for this breakpoint. This instruction can only be used in the DIRECT mode.

<RBRK><BYTE> Resets the breakpoint described with the argument <BYTE>. This instruction can only be used in the DIRECT mode.

<RUN> Exits trace mode and continues to run the script from the current location until a breakpoint is found. This instruction can only be used in the DIRECT mode.

<ADDR> When interrogating the device directly, ADDR returns the script instruction pointer.

<LDAUX> Loads a block of native machine code API and then assigns it an AUX number. Once the block of native machine code is loaded and assigned an AUX number, that native machine code can be called from the script using an AUX instruction. This <LDAUX> instruction can, for example, be used to load an API onto the virtual machine.

<LDSAUX> Uses the IR receiver functionality 6 and loader 7 to receive a script API and loads it into memory on the virtual machine. This instruction is similar to the <LDAUX> instruction above, except that it allows a block of script (as opposed to a block of machine code) to be loaded into memory and assigned an AUX number. Script executing on the virtual machine can then call the loaded block of script using the AUX instruction.

<EAUX> "Erase all auxiliary machine code APIs" instruction. Causes the loader functionality to erase all machine code APIs and to remove all references to them from the AUX table. In some embodiments, the instruction causes all machine code API's to be erased from memory as well. Where the memory storing the machine code APIs is FLASH, a block erase of memory is used.

<ESAUX> "Erase all auxiliary script APIs" instruction. Causes the loader functionality to remove all references to all auxiliary script APIs from the AUX table. In some embodiments, the instruction causes all script API's to be erased from memory as well. Where the memory storing the script APIs is FLASH, a block erase of memory is used.

<EXTEND> In FIG. 13, all the instructions have one-byte opcodes. To allow the addition of more script instructions, a set of two-byte opcode instructions is supported. The first byte of such a two-byte opcode instruction is the "FF"<extend> instruction. This means that the following byte is the second opcode byte. A table of the two-byte opcode instructions like the table of FIG. 13 can be created in the future to support the needs of future applications.

A Comparison:

In one specific embodiment, the processor executing the virtual machine (referred to here as the Zilog Virtual Machine or "ZVM") is an 8-bit Z8 Encore microcontroller available from Zilog, Inc. of San Jose, Calif. The processor is part of an inexpensive remote control device and has only 64 k bytes of program memory (FLASH in this case) and only 4 k bytes of RAM.

A Java virtual machine known as the Kilobyte Virtual Machine (KVM) is a 32-bit virtual machine intended for use on small, resource-constrained devices such as cellular phones, PDAs, smart cards and set-top boxes. The KVM is either the smallest or one of the smallest JVM implementations. In a very boiled down embodiment, the KVM requires approximately 40 k bytes of program memory for the actual virtual machine code itself.

If an attempt were made to implement the KVM on a Z8 Encore, then only approximately 24 k of FLASH program memory would be left for the program code of the various APIs (for example, the loader functionality, the IR transmission engine, and the IR receiver functionality, the key scanning functionality, and the level one builder), and for the actual script (the actual script includes information on how to generate operational signals in a selected one of many different codesets). It is doubtful that the API functions and the needed amount of codeset information could be fit fully and comfortably into just 24 k bytes of program memory available on the Z8 Encore.

In addition to program memory constraints, the KVM also requires approximately 32 k bytes of RAM for use by the KVM in order to implement the virtual machine. In addition to this amount of RAM required for use by the virtual machine code itself, additional RAM is needed for use in receiving downloaded scripts and for use by the script. The total amount of RAM required to implement the IR remote control functionality set forth above would certainly exceed 32 k bytes. The Z8 Encore, however, only has 4 k bytes of RAM total. Accordingly, it is seen that the memory resources required to implement the KVM Java virtual machine preclude the KVM JVM from use on an inexpensive Z8 Encore remote control device platform. RAM memory utilization in ZVM, on the other hand, is of the order of tens of bytes (not tens of kilobytes as in the case of KVM).

One reason that the KVM virtual machine has a large memory footprint is that the KVM virtual machine is a stack-based virtual machine. The underlying processor, on the other hand, is a register-based machine. Having a register-based machine emulate a higher-level stack-based architecture introduces inefficiencies and makes the virtual machine code larger.

To interpret an instruction on a stack-based virtual machine, the arguments of the instruction are placed onto the stack. When the instruction is interpreted, arguments in the stack are operated upon. The KVM Java virtual machine is a stack-based virtual machine because it is to be backward compatible with larger Java virtual machines. The larger Java virtual machines are stack-based because they were initially intended for use on larger computers such as personal computers that had far more processing and memory resources. The larger Java virtual machines were made to be stack-based so that they would not declare more registers than exist on whatever platform they are running on. Because the larger Java virtual machine was to be able to be implemented on any possible personal computer type machine, the designers of Java did not want to impose limits on the number of registers that the underlying hardware had to have. Java was therefore made to utilize stacks in order to make the scripting language independent of the registers of the underlying machine. Making the Java virtual machine stack-based, however, built in inefficiencies in realizing the code of the virtual machine in cases where the underlying hardware is a register-machine. Due to the 32-bit virtual machine implementation, and due to the stack-based implementation, implementation of the KVM JVM is inefficient on an underlying register-based machine such as the Z8 Encore.

ZVM, on the other hand, is a register-based virtual machine. Not only is it a register-based virtual machine, but it is also an 8-bit virtual machine as compared with KVM JVM, which is a 32-bit virtual machine. The ZVM script interpreter is therefore efficiently coded and is comfortably realized on a Z8 Encore platform. The ZVM script interpreter can be coded compactly so that it occupies no more than approximately 4 k bytes of program memory using under 256 bytes of RAM. The API functionalities occupy the following approximate amounts of program memory: IR transmitter API: 2 k bytes; loader API: 4 k bytes; IR receiver API: 1.0 k bytes; key scanning API: 0.25 k bytes; level one builder API: 0.5 k bytes; and execute script direct API: 0.5 k bytes. The total ZVM including the script interpreter and a set of API functionalities can be implemented in approximately 11-13 k bytes of program memory or less. It is noted that ZVM does involve a stack as described above in the detailed description. This stack, however, is a different kind of stack in that it is used for storage of values and for handling subroutines. Script instructions do not generally act on arguments when the arguments are present in the stack.

KVM JVM executes on an operating system that supports multithreading and garbage collection functions. The total amount of software implemented on the platform is therefore large. ZVM, in contrast, is made small and compact by having no underlying operating system executing on the platform, and by avoiding the temptation to provide multithreading or garbage collection functions. ZVM does not support multithreading and does not have garbage collection functions.

In addition to the differences outlined above between ZVM and the KVM Java virtual machine, the ZVM virtual machine and the scripts interpreted by it can be made small and compact because the types of instructions making up the scripting language are low-level instructions. KVM JMV script instructions, in comparison, are relatively high-level abstract instructions (analogous to a higher-level language C). ZVM, on the other hand, interprets relatively low-level script instructions (analogous to assembly). ZVM, in this sense, can be thought of as an assembly-level virtual machine.

Website for Community of Users:

In one example, a website provides users of the virtual machine an ability to share scripts and APIs and information on the use of the virtual machine. The website may, for example, be a publicly available website sponsored by a supplier of the virtual machine where the underlying hardware platform is an integrated circuit manufactured and sold by the supplier. The website provides, among other things, a number of APIs specific to the underlying hardware platform.

Consider an example in which an end user has a virtual machine that was manufactured and sold by the supplier. The underlying hardware of the virtual machine includes an RS-232 type port including control registers and a FIFO via which RS-232 type communications can be received onto the hardware platform and via which RS-232 type communications can be transmitted from the hardware platform. Although the hardware platform has this RS-232 port circuitry, the virtual machine in the possession of the user does not include APIs for accessing and communicating with the RS-232 port circuitry. In accordance with one novel aspect, such a user accesses the website described above and peruses a list of APIs available for downloading. The user may read testimonials posted on the website identified with the various APIs. The user notices a machine code API that allows communications over the RS-232 type port of the underlying hardware platform in the possession of the user. The user downloads the API from the website using the Internet, puts the virtual machine into its DIRECT mode, and then loads the machine code API into the virtual machine using the <LDAUX> script instruction in the DIRECT mode. The loader functionality loads the machine code API byte by byte into the virtual machine and assigns the machine code API the next AUX number. The user is then able to try the newly loaded API. The user may, for example, see if the newly loaded API allows easy communication over the RS-232 type port. If the newly loaded API is not to the user's liking, then the user can erase the newly loaded API by injecting the <EAUX> and <ESAUX> script instructions into the virtual machine in the DIRECT mode, and then reloading the API's that were previously on the virtual machine using the <LDAUX> and <LSAUX> script instructions in the DIRECT mode. This causes the loader to load the previous APIs back onto the virtual machine such that they are packed into contiguous memory locations without gaps between the various APIs. The result is that the virtual machine is in the same condition as it was prior to the user's trying of the downloaded machine code API. In this fashion, the user can download and try APIs from the website. If the user does not like a newly loaded API, the user can remove it from the user's virtual machine.

In addition to downloading from the website, a user can post software and information on the website. The user may, for example, read out the contents of memory using the DIRECT mode, place those contents in a text file, and then post the text file on the website for use by other users. The user may post APIs and scripts in this fashion. The user may also post textual information about any such posted APIs or scripts.

The website may include numerous script interpreters for downloading by users. Script interpreters for different hardware platforms may be provided. The website may include other software tools for developing scripts and for developing APIs. The accessibility of the publicly available website fosters the interchange of information and helpful hints about how to use the virtual machine in different applications and with different hardware platforms.

One Exemplary Control and Monitoring Application:

In one example, multiple remotely deployed ZVM virtual machine devices perform control and monitoring functions (for example, motor control functions) and are deployed in a larger machine (for example, an automobile or other vehicle) such that they can communicate with each other over a wired bus (for example, a CAN bus). Code (for example, a script API or a machine code API) that determines how a selected one of the ZVM virtual machine devices performs its control and/or monitoring functions is downloaded into a selected one of the ZVM virtual machine device using the wired bus. The ZVM virtual machine devices are chained together in serial fashion by the wired bus. When the code is to be loaded into the selected one of the ZVM virtual machine device, then ZVM virtual machine devices in the chain upstream of the selected ZVM virtual machine device relay the code down the chain to the selected device into which the code is then loaded. In the same way that code is relayed down the chain to a selected ZVM virtual machine device, so too can DIRECT instructions be relayed down the chain to a selected ZVM virtual machine. Relayed DIRECT instructions can be used to test and retrieve diagnostic information from the selected ZVM virtual machine.

Compact Disc Appendix:

The Compact Disc contains an embodiment of a level one builder functionality, a key-scanning functionality and an IR transmission engine functionality. The level one builder functionality is written in the C programming language. The key scanning functionality and the IR transmission engine functionality are written in assembly code.

CONCLUSION

Although certain specific exemplary embodiments are described above in order to illustrate the invention, the invention is not limited to the specific embodiments. Although the virtual machine is described above as generating communications in accordance with an IR (infrared) communication protocol usable in remote control devices, a virtual machine in accordance with the present invention is also usable to communicate in accordance with other communication protocols including: IrDA, RF (radio frequency) protocols usable in consumer devices such as garage door openers, protocols usable to transmit signals over a wired or fibre optic link in either serial or parallel form, protocols used by RFID tags to communicate such as an absorption modulation protocol, protocols used by SmartCards to communicate, protocols such as IEEE 802.11 usable in wireless LANs, and protocols usable in cellular telephone communications.

Although the bidirectional link in the embodiment of FIG. 1 involves IR transmitter 12 and IR receiver 15, a bidirectional link in other embodiments can be an RF bidirectional link. The bidirectional IR link can be an IrDA link. The bidirectional link can involve communication over a wire or wires, or the bidirectional link can involve wireless communication. A script being interpreted by a virtual machine can cause communication over more than one communication link. API functionality can be provided to enable a script to control a display, a light emitting diode (LED), a speaker, a buzzer, a card-reader, a photodetector, a bus controller, a motor, an engine, a relay, a switch, a transceiver, a sensor, or another input/output device. API functionality can be provided to enable a script to interface with any type of device that commonly interfaces with a microcontroller. Where an inexpensive microcontroller-based device is deployed in the field at a remote location but communicates remotely via a bus or network, software in the remote device can be updated remotely by communicating a script and/or API to the remote device via the bus or network and downloading the script and/or API into the remote device and then causing the virtual machine in the remote control device to interpret the downloaded script. In this way, software in the remote devices can be updated remotely across the bus or network. Where the remote devices communicate using a wireless link such as an RF link, the software updating can be performed across this wireless link. The virtual machine and novel aspects described above can be applied to home appliances, industrial controls, and other monitoring and control applications other than remote control devices. The virtual machine can involve an interpreter executing on an underlying processor platform such as a microcontroller. The virtual machine can also be a dedicated hardware processor specifically designed to execute the script instructions. In one embodiment, the dedicated hardware processor is realized by configuring a field programmable gate array (FPGA).

Although the generation of an operational signal is described above using a mark/space table and a string of timing information that references the mark/space table, the novel virtual machine described above is usable to generate an operational signal using other information including, for example, a string of values where each value in the string represents a time value or a value used to load a timer. Successive values in the string represent the times that the operational signal has one digital value and then has the opposite digital value. Accordingly, various modifications, adaptations, and combinations of various features of the described embodiments can be practiced without departing from the scope of the invention as set forth in the claims.

What is claimed is:

1. A method comprising:

detecting that a command is chosen on a remote control device;

generating a mark/space table on the remote control device after the detecting that the command was chosen, wherein the mark/space table contains a mark time and a space time associated with a codeset, and wherein a command code of the codeset corresponds to the command;

generating a string of timing information that references the mark time and the space time; and generating an operational signal using the string of timing information, wherein the operational signal contains the command code.

2. The method of claim 1, wherein the generating the mark/space table is performed by interpreting a script.

3. The method of claim 1, wherein the generating the operational signal involves retrieving the mark time and the space time from the mark/space table.

4. The method of claim 1, wherein the mark/space table does not contain any mark time that is not used in the generating the operational signal.

5. The method of claim 1, wherein the operational signal is received by an electronic consumer device and causes the electronic consumer device to perform a function corresponding to the command that was chosen.

6. The method of claim 1, wherein the mark/space table contains modulation information describing an amount of time during which a modulation signal is a digital high.

7. The method of claim 1, wherein the mark time is an N-bit value, wherein the string of timing information comprises an M-bit index that points to the mark time, and wherein N is larger than M.

8. The method of claim 1, wherein the string of timing information is comprised of bytes, wherein each byte has a designator bit with a digital value, and wherein the digital value indicates whether the byte is a mark/space-pair byte or a control byte.

9. The method of claim 1, wherein the string of timing information comprises a frame of bytes, the frame of bytes includes a control byte, the control byte has a REP bit and repeat bits, and wherein the operational signal is generated, when the REP bit is set, by repeating the frame by a number of times indicated by the repeat bits.

10. The method of claim 1, wherein the string of timing information comprises a frame of bytes, the frame of bytes includes a control byte, the control byte has an end-of-frame bit, and wherein the control byte ends the frame when the end-of-frame bit is set.

11. The method of claim 1, wherein the string of timing information comprises a frame of bytes, the frame of bytes includes a control byte, the control byte has an end-of-transmission bit, and wherein the control byte ends the string of timing information when the end-of-transmission bit is set.

12. A method comprising:
  interpreting a script on a remote control device, the script containing codeset information corresponding to an electronic consumer device, the codeset information including a keycode, a mark time and a space time, wherein the keycode corresponds to a function of the electronic consumer device;
  storing a first N-bit value in a table, wherein the first N-bit value describes the mark time;
  storing a second N-bit value in the table, wherein the second N-bit value describes the space time; and
  generating a string of M-bit indices, wherein the string comprises a first M-bit index that points to the first N-bit value and a second M-bit index that points to the second N-bit value, wherein N is larger than M, wherein the string is used to generate an operational signal, and wherein the keycode is modulated onto the operational signal using the mark time and the space time.

13. The method of claim 12, wherein the interpreting the script is performed after a key on the remote control device is pressed, and wherein the keycode corresponds to the key that was pressed.

14. The method of claim 12, wherein all N-bit values in the table that describe mark times or space times are pointed to by M-bit indices of the string of M-bit indices.

15. The method of claim 12, wherein the table contains modulation information describing an amount of time during which a data signal is a digital high, wherein the data signal is modulated onto the operational signal.

16. The method of claim 12, wherein the string of M-bit indices is comprised of bytes, wherein each byte has a designator bit with a digital value, and wherein the digital value indicates whether the byte is a mark/space-pair byte or a control byte.

17. The method of claim 12, wherein the string of M-bit indices comprises a frame of bytes, the frame of bytes includes a control byte, the control byte has a REP bit and repeat bits, and wherein the operational signal is generated, when the REP bit is set, by repeating the frame by a number of times indicated by the repeat bits.

18. The method of claim 12, wherein the string of M-bit indices comprises a frame of bytes, the frame of bytes includes a control byte, the control byte has an end-of-frame bit, and wherein the control byte ends the frame when the end-of-frame bit is set.

19. The method of claim 12, wherein the string of M-bit indices comprises a frame of bytes, the frame of bytes includes a control byte, the control byte has an end-of-transmission bit, and wherein the control byte ends the string of M-bit indices when the end-of-transmission bit is set.

20. A device comprising:
  a microcontroller in a remote control device, wherein the remote control device has a key; and
  means for generating a mark/space table and a string of timing information on the remote control device after the key is pressed, wherein the mark/space table contains a mark time and a space time associated with a codeset, wherein a keycode of the codeset corresponds to the key, and wherein the string of timing information references the mark time and the space time.

21. The device claim 20, wherein an operational signal is generated using the string of timing information, and wherein the operational signal contains the keycode.

22. The device claim 21, wherein the operational signal is received by an electronic consumer device and causes the electronic consumer device to perform a function corresponding to the key that was pressed.

* * * * *